(12) United States Patent
Fukuma et al.

(10) Patent No.: US 7,010,146 B2
(45) Date of Patent: Mar. 7, 2006

(54) DATABASE CONSTRUCTING SYSTEM

(75) Inventors: Yasufumi Fukuma, Tokyo (JP); Takeyuki Kato, Tokyo (JP); Narumi Machida, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 790 days.

(21) Appl. No.: 09/879,704

(22) Filed: Jun. 12, 2001

(65) Prior Publication Data

US 2001/0051953 A1 Dec. 13, 2001

(30) Foreign Application Priority Data

| Jun. 12, 2000 | (JP) | ............................. 2000-175776 |
| Jun. 12, 2000 | (JP) | ............................. 2000-175777 |
| Jun. 29, 2000 | (JP) | ............................. 2000-196561 |

(51) Int. Cl.
G06K 9/00 (2006.01)

(52) U.S. Cl. ...................... 382/118; 351/246; 382/154; 382/190; 705/26; 707/102

(58) Field of Classification Search ................. 33/200, 33/507; 345/629, 630, 632; 351/159, 177, 351/178, 200, 204–205, 206–207, 216, 227, 351/246; 382/117, 118, 165, 170, 190, 224, 382/154; 705/26
See application file for complete search history.

(56) References Cited

U.S. PATENT DOCUMENTS

| 5,280,570 A | * | 1/1994 | Jordan ......................... 345/632 |
| 5,576,778 A | * | 11/1996 | Fujie et al. .................. 351/177 |
| 5,592,248 A | * | 1/1997 | Norton et al. ............... 351/246 |
| 5,617,155 A | * | 4/1997 | Ducarouge et al. ......... 351/204 |
| 5,983,201 A | * | 11/1999 | Fay .............................. 705/27 |
| 5,991,429 A | * | 11/1999 | Coffin et al. ................ 382/118 |
| 6,142,628 A | * | 11/2000 | Saigo .......................... 351/204 |
| 6,231,188 B1 | * | 5/2001 | Gao et al. .................... 351/227 |
| 6,508,553 B1 | * | 1/2003 | Gao et al. .................... 351/227 |
| 6,535,223 B1 | * | 3/2003 | Foley .......................... 345/629 |
| 6,574,354 B1 | * | 6/2003 | Abdel-Mottaleb et al. .. 382/118 |
| 6,634,754 B1 | * | 10/2003 | Fukuma et al. ............. 351/227 |
| 6,681,032 B1 | * | 1/2004 | Bortolussi et al. .......... 382/118 |
| 6,736,506 B1 | * | 5/2004 | Izumitani et al. ........... 351/204 |
| 6,791,584 B1 | * | 9/2004 | Xie .............................. 351/204 |
| 6,792,401 B1 | * | 9/2004 | Nigro et al. .................. 703/6 |
| 6,944,327 B1 | * | 9/2005 | Soatto ........................ 382/154 |

* cited by examiner

Primary Examiner—Bhavesh M. Mehta
Assistant Examiner—Gregory Desire
(74) Attorney, Agent, or Firm—Chapman and Cutler LLP

(57) ABSTRACT

In order to provide a database constructing system in which information from a plurality of persons can be automatically collected without being limited to a customer visiting a store and personal goods to wear or carry which the person likes associated with the personal characteristics to construct database, the database constructing system comprises a web server 11 for showing information on eyeglass frame; a statistical analyzing means 24 for dividing a personal facial picture 22a into component to classify them into a type of every facial component 22c and statistically analyzing a relationship between the type of every component 22c and a selected eyeglass frame 14 in order to collect data for associating a personal facial type with the selected eyeglass frame 14 on the basis of the personal facial picture 22a and information on the eyeglass frame 14 selected by the person transmitted to the web server 11 by using a web browser; and a memory means 21 for associating and preserving the information on type of every facial component 22c and the selected eyeglass frame 14.

11 Claims, 19 Drawing Sheets

FIG. 5
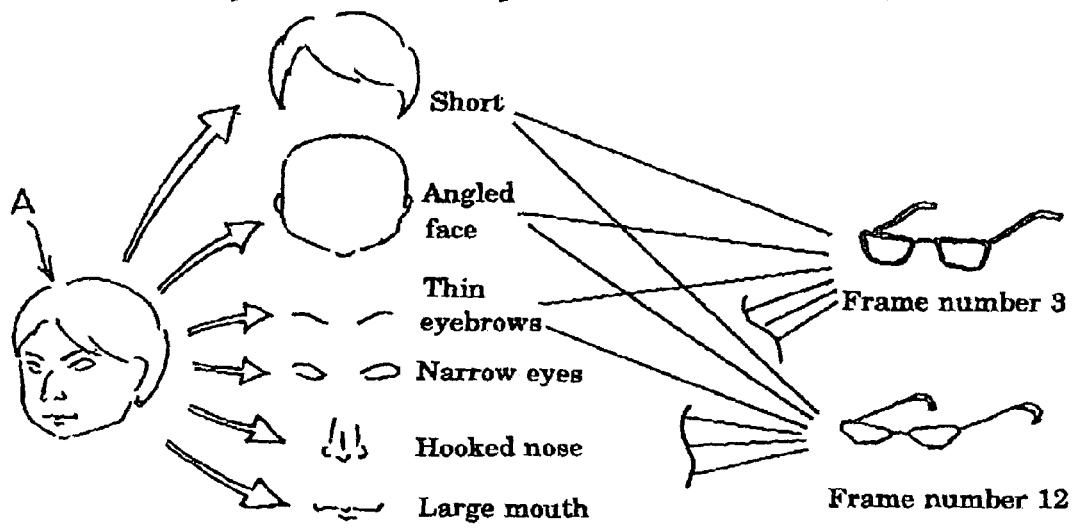
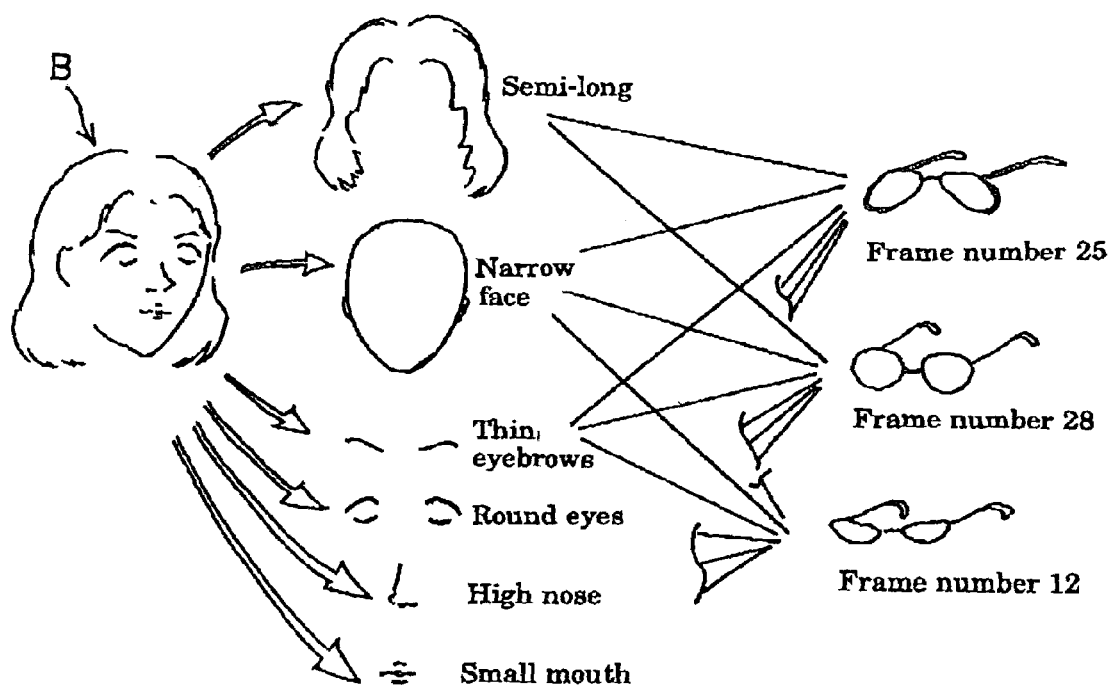

FIG. 6

| Component 22c | Type | | |
|---|---|---|---|
| Hairstyle | Short | No.1 | |
| | | No.2 | |
| | | No.3 | |
| | | : | |
| | Semi-long | No.1 | |
| | | No.2 | |
| | | No.3 | |
| | | : | |
| | Long | No.1 | |
| | | No.2 | |
| | | No.3 | |
| | | : | |
| | : | : | |
| Contour | Round face | No.1 | |
| | | No.2 | |
| | | No.3 | |
| | | : | |
| | Angled face | No.1 | |
| | | No.2 | |
| | | No.3 | |
| | | : | |
| | Narrow face | No.1 | |
| | | No.2 | |
| | | No.3 | |
| | | : | |
| | : | : | |
| Eyebrows | Thin eyebrows | No.1 | |
| | | No.2 | |
| | | No.3 | |
| | | : | |
| | Thick eyebrows | No.1 | |
| | | No.2 | |
| | | No.3 | |
| | | : | |
| | : | : | |
| Eyes | Narrow eyes | No.1 | |
| | | No.2 | |
| | | No.3 | |
| | | : | |
| | Round eyes | No.1 | |
| | | No.2 | |
| | | No.3 | |
| | | : | |
| : | : | : | |

F I G. 1 1
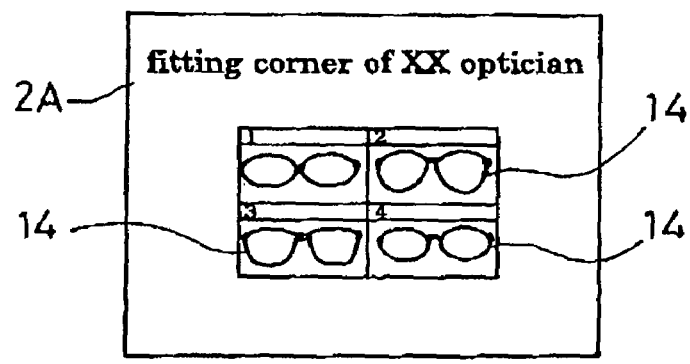
F I G. 1 2
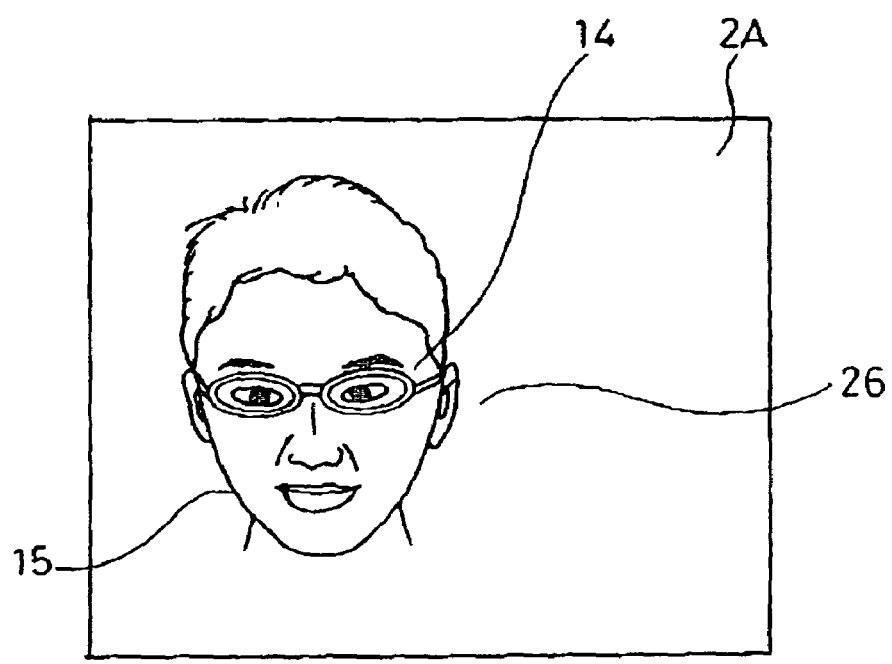

DATABASE CONSTRUCTING SYSTEM

BACKGROUND OF THE INVENTION

1. Field of the Invention

The present invention relates to a database constructing system in which data for associating personal goods to wear or carry such as handbag, accessories, eyeglass frame and shoes which a person likes, with the personal characteristics can be collected to construct database, an eyeglass frame selecting service system, an eye test service system in which the person can try wearing an eyeglass frame at his/her own home, and a program product thereof.

2. Description of the Related Art

Conventionally, at the optician where a customer visits, a clerk recommends an eyeglass frame that the customer seems to like, or recommends an eyeglass frame that seems to suit the customer, but there is a customer who does not always want to be recommended by the clerk.

Such customer looks into a showcase of eyeglass lens, and selects a suitable eyeglass frame, but the eyeglass frame shown in the showcase is not necessarily preferable for the customer.

In such a case, if the eyeglass frame which seems to suit the customer or the eyeglass frame which the customer seems to like, can be automatically picked up, for the customer the time required for selecting the eyeglass frame is shortened, and for the optician the clerk needs not to receive the customer excessively. Also, when many customers visit the optician, there is a limit for service that one clerk can afford to several customers, but if the eyeglass frame that the customer seems to like can be automatically picked up, it can be expected that the service for the customer be improved.

In order to accomplish the above-mentioned demand, conventionally, the optician prepares a customer-managing database, but, since the number of individuals is limited, it was insufficient for grasping general trend of facial type and eyeglass frame. Also, since the database is prepared by manual input, much labor is required, and there was a possibility of making the input mistake. This kind of problem is not limited to the optician, and exists in a store or a specialty store selling handbag, shoes, or accessories.

Also, the optician allows the visited customer to select the eyeglass frame, shows face of the customer wearing the eyeglasses by a mirror, allows the customer to order favorite eyeglass frame, inserts eyeglass lenses to the eyeglass frame, and sells the eyeglasses to the customer, but in the conventional selling system of the optician, unless the customer visits the optician personally, the customer cannot try fitting the eyeglass frame, and it is inconvenient for the customer who has no time.

Today when the Internet has been developed and advanced, if the system in which the optician opens a homepage, a person accepts the homepage on a monitor screen of a personal computer at his/her own home, and selects an eyeglass frame on the monitor screen, and the eyeglass frame is synthesized with a facial picture can be constructed, the person having the personal computer can try wearing the eyeglass frame at his/her own home, and it is convenient that time for visiting the optician personally is saved. Also, it is preferable that the person can select the eyeglass frame at his/her own home until he/her finds the favorite eyeglass frame.

However, in the above described system, since an eye test data is omitted, if the eye test data can be obtained by the customer, the more certain selection of the eyeglass frame can be preferably performed. In this point of view, the construction of an eye test service equipment such as short-sightedness, has been suggested.

In automated eye test service equipment, it may be supposed that a user being served the eye test service may perform a series of operations from the eye test to selection of the eyeglass frame, but it is afraid that taking too long time to select the eyeglass frame and that waiting time of a next user who will use the eye test service becomes longer, thereby causing difficulty to the eye test service itself.

SUMMARY OF THE INVENTION

The object of the present invention is to provide a database constructing system in which the information on a plurality of persons can be automatically collected without being limited to a customer to visit optician, and the database can be constructed by associating the personal goods to wear or carry that the person likes with the personal characteristics.

Further, another object of the present invention is to provide to an eyeglass frame selecting service system in which the eyeglass frame which seems to suit a customer or the eyeglass frame which the customer seems to like is automatically picked up and shown, and a program product thereof.

In addition, another object of the present invention is to provide an eye test service system in which the selection of the eyeglass frame can be performed until a customer finds the favorite eyeglass frame without causing difficulty to the eye test service itself.

In order to attain the above objects, the database constructing system described in a first aspect of the present invention comprises: a web server for showing information on personal goods to wear or carry; a statistical analyzing means for dividing a personal body picture into component to classify them into a type of every component and statistically analyzing a relationship between the type of every component and selected personal goods to wear or carry in order to collect data for associating the personal body characteristics with the selected personal goods to wear or carry on the basis of the personal body picture and the information on the personal goods to wear or carry selected by the person transmitted to the web server by using a web browser; and a memory means for associating and preserving the information on type of every component and the selected personal goods to wear or carry.

According to the invention described in the first aspect, since bodily characteristics of the person accessing the homepage of the personal goods to wear or carry store, and the type of personal goods to wear or carry which the person likes are associated and classified, the database associating the personal bodily characteristics with a trend of the type of personal goods to wear or carry which the person likes can be automatically and efficiently constructed.

The database constructing system described in a second aspect of the present invention comprises: a web server for showing information on eyeglass frame; a statistical analyzing means for dividing a personal facial picture into component to classify them into a type of every facial component and statistically analyzing a relationship between the type of every facial component and the selected eyeglass frame in order to collect data for associating the personal facial type with the selected eyeglass frame on the basis of the personal facial picture and the information on the eyeglass frame selected by the person transmitted to the web server by using a web browser; and a memory means for associating and preserving the information on type of every facial component and the selected eyeglass frame.

According to the invention described in the second aspect, since a facial type of the person accessing the homepage of the optician and a type of the eyeglass frame which the person likes are associated and classified, the database associating a type of the personal facial component with a trend of the type of the eyeglass frame which the person likes can be automatically and efficiently constructed.

In the database constructing system described in a third aspect of the present invention, the statistical analyzing means divides automatically the personal facial picture into the component to classify them into a type of every facial component, and analyzes statistically a relationship between the type of every facial component and the selected eyeglass frame.

The database constructing system described in a fourth aspect of the present invention further comprises a display means for displaying the relationship between the type of every facial component and the selected eyeglass frame by a statistical display method, the association between the type of every facial component and the selected eyeglass frame being performed by manual input.

According to the invention described in the fourth aspect, since the displaying means is included, the relationship between the type of every facial component and the selected eyeglass frame can be distributively displayed in detail, and the trend that the person desires can be visually and easily grasped.

In the database constructing system described in a fifth aspect of the present invention, the statistical analyzing means has an extracting means for extracting the facial component from the facial picture.

According to the invention described in the fifth aspect, since the extracting means for extracting the facial component from the facial picture is included, the facial component can be automatically extracted, and a large amount of database can be more effectively constructed.

In the database constructing system described in a sixth aspect of the present invention, the facial component is selected from facial contour, hair, facial color, eyes, eyebrows, nose, ears, mouth and jaw.

In the database constructing system described in a seventh aspect of the present invention, at least age and gender are transmitted together with the facial picture to be reflected to the database construction.

In the database constructing system described in an eighth aspect of the present invention, racial information is transmitted together with the facial picture to be reflected to the database construction.

In the database constructing system in a ninth aspect of the present invention, the selected eyeglass frame is subdivided into any combination of the components such as shape, color, material, maker name and designer name to be associated with the type of facial component.

According to the invention described in the ninth aspect, since the selected eyeglass frame is subdivided into any combination of the components such as shape, color, material, maker name and designer name, each component of eyeglass frame can be associated with the type of the facial component to be classified.

In the database constructing system described in a tenth aspect of the present invention, the preference degree for the former selected eyeglass frame is determined on the basis of the time interval between the former selected eyeglass frame and the latter selected eyeglass frame.

According to the invention described in the tenth aspect, since the preference degree for the eyeglass frame is determined on the basis of the time for selecting the eyeglass frame, the degree that the person likes the selected eyeglass frame can be easily and quantitatively determined.

In the database constructing system described in an eleventh aspect of the present invention, when an eyeglass frame different from the former selected eyeglass frame is selected, and then, the same eyeglass frame as the former selected eyeglass frame is selected again, the preference degree for the selected eyeglass frame is determined considering that the former selected eyeglass frame is suitable.

According to the invention described in the eleventh aspect, since the preference degree for the eyeglass frame is determined considering that once more selected eyeglass frame is favorite, it can be easily and quantitatively determined how much the person likes the eyeglass frame.

The database constructing system described in a twelfth aspect of the invention comprise: a web server for showing information on eyeglass frame; a statistical analyzing means for dividing a personal facial picture into component to extract facial characteristics and statistically analyzing a relationship between the facial characteristics and the selected eyeglass frame in order to collect data for associating the personal facial characteristics with the selected eyeglass frame on the basis of the personal facial picture and the information on the eyeglass frame selected by the person transmitted to the web server by using a web browser; and a memory means for associating and preserving the information on facial characteristics and the selected eyeglass frame.

According to the invention described in the twelfth aspect, since the facial characteristic portion of the person accessing the homepage of the optician and the type of eyeglass frame which the person likes are associated and classified, though process of a large amount of data or the data preservation is not performed, the database associating the personal facial characteristics with a trend of the type of eyeglass frame which the person likes can be automatically and efficiently constructed.

The program product described in a thirteenth aspect of the present invention comprises: a program for executing an extracting step for extracting facial component from a facial picture; a program for executing a step for comparing the facial component with a predetermined determining reference to classify every type of the component on the basis of the executed result of the extracting program; a program for executing a statistical analyzing step for statistically analyzing a relationship between the component classified by type and the selected eyeglass frame; and a program for executing a preserving step for preserving the statistical analyzing result.

The eyeglass frame selecting service system described in a fourteenth aspect of the present invention comprises: a memory means for dividing information on a facial component to memorize eyeglass frame information associated with a type of every component; an extracting means for extracting the facial component from a customer's facial picture; a selecting means for selecting an eyeglass frame memorized in the memory means on the basis of the extracted result of the extracting means; and a showing means for showing the selected eyeglass frame.

The eyeglass frame selecting service system described in a fifteenth aspect of the present invention further comprises an associating means for dividing the facial component to associate a type of every component with the information on the eyeglass frame.

In the eyeglass frame selecting service system described in a sixteenth aspect of the present invention, the facial component is selected from facial contour, eyebrows, hair, eyes, nose, ears, mouth, jaw and color.

In the eyeglass frame selecting service system described in a seventeenth aspect of the present invention, the showing means is a server apparatus for generating a homepage, the server apparatus has a synthesizing means for synthesizing the selected eyeglass frame with the facial picture when a customer transmits the facial picture and accesses the server apparatus in order to order the eyeglass frame by using the Internet, and the showing means transmits the synthesized picture to the customer.

The eyeglass frame selecting service system described in an eighteenth aspect of the present invention further comprises a photographing means for photographing a face, the eyeglass frame being selected and shown on the basis of a facial picture photographed by the photographing means when a customer visits optician.

In the eyeglass frame selecting service system described in a nineteenth aspect of the present invention, the face of the customer whose facial picture is registered is divided into the component, an eyeglass frame associated with a type of every facial component being synthesized with the facial picture, the facial picture synthesized with the eyeglass frame being attached to an electronic mail to be transmitted to the customer.

The eyeglass frame selecting service system described in a twentieth aspect of the present invention comprises: a memory means for preserving eyeglass flame information associated with the facial characteristic information; an extracting means for extracting the facial characteristics from a customer's facial picture; a selecting means for selecting an eyeglass frame memorized in the memory means on the basis of the extracted result of the extracting means; and a showing means for showing the selected eyeglass frame.

The program product for eyeglass frame selecting service described in a twenty-first aspect of the present invention comprising: a program for executing an extracting step for extracting a facial component from a customer's facial picture; a program for executing a selecting step for selecting an eyeglass frame associated with facial characteristics from a memory means on the basis of the executed result of the extracting program; and a program for executing a showing step for showing the eyeglass frame selected by executing the selecting program.

In the eye test service system described in a twenty-second aspect of the present invention, an eye test service apparatus having a photographing camera which photographs a facial picture of a user of an eye test service and obtaining eye test data of an objective eye of the service user and further connected to a database system through a communication line is provided at an eye test service equipment; and an issue apparatus for issuing a user ID for specifying the user and a user password for calling out the photographed facial picture is provided at the eye test service apparatus or the database system, the database system being provided with an eye test data memory means for preserving the eye test data, a memory means for preserving the information on facial picture, and a web server for showing the facial picture when the service user inputs the user ID and the user password by using a terminal to access the database system.

In the eye test service system described in a twenty-third aspect of the present invention, the database system is provided with an eyeglass frame data memory means, and the web server is provided with a selecting means for selecting the eyeglass frame and a picture synthesizing means for synthesizing the selected eyeglass frame with a facial picture.

In the eye test service system described in a twenty-fourth aspect of the present invention, the issue apparatus issues the user ID and the user password on the basis of the input of the electronic mail address of the service user.

In the eye test service system described in a twenty-fifth aspect of the present invention, an eye test service apparatus having a photographing camera which photographs a facial picture of a user of an eye test service and obtaining eye test data of an objective eye of the service user and further connected to a database system through a communication line is provided at an eye test service equipment; and an issue apparatus for issuing a user ID for specifying the user and a transmitting means for transmitting the facial picture to a terminal of the service user is provided at the eye test service apparatus or the database system, the database system being provided with an eye test data memory means for preserving the eye test data, and a web server having an eyeglass frame showing means for showing an eyeglass frame when the service user inputs the user ID by using the terminal to access the database system, the terminal being provided with a picture synthesizing means for synthesizing the selected eyeglass frame with the facial picture to display the synthesized picture.

In the eye test service system described in a twenty-sixth aspect of the present invention, the transmitting means transmits the facial picture to the terminal on the basis of the input of an electronic mail address.

The database constructing system for eyeglasses described in a twenty-seventh aspect of the present invention comprises: a web server for showing information on eyeglass frame and items for inputting personal characteristic portion; a statistical analyzing means for collecting data for associating the personal characteristics with the selected eyeglass frame and statistically analyzing a relationship between the personal characteristics and the selected eyeglass frame by the data based on the input items of the personal characteristic portion transmitted to the web server by using a web browser and the information on the eyeglass frame selected by the person; and a memory means for associating and preserving the information on personal characteristics with the selected eyeglass frame.

BRIEF DESCRIPTION OF THE DRAWINGS

The above objects, other objects, features and advantages of the present invention will be better understood from the following description taken in conjunction with the accompanying drawings, in which:

FIG. 5 is an explanatory view schematically explaining the association of the component of the facial picture statistically analyzed by a statistical analyzing means with the selected eyeglass frame;

FIG. 6 illustrates an example of the display in the statistical display method of the database constructing system for eyeglasses relating to the first embodiment;

FIG. 11 illustrates an example of the selected frame displayed on the monitor screen;

FIG. 12 illustrates an example of the synthesized picture displayed on the monitor screen;

DETAILED DESCRIPTION OF THE PREFERRED EMBODIMENTS

First Embodiment

Figure 1:
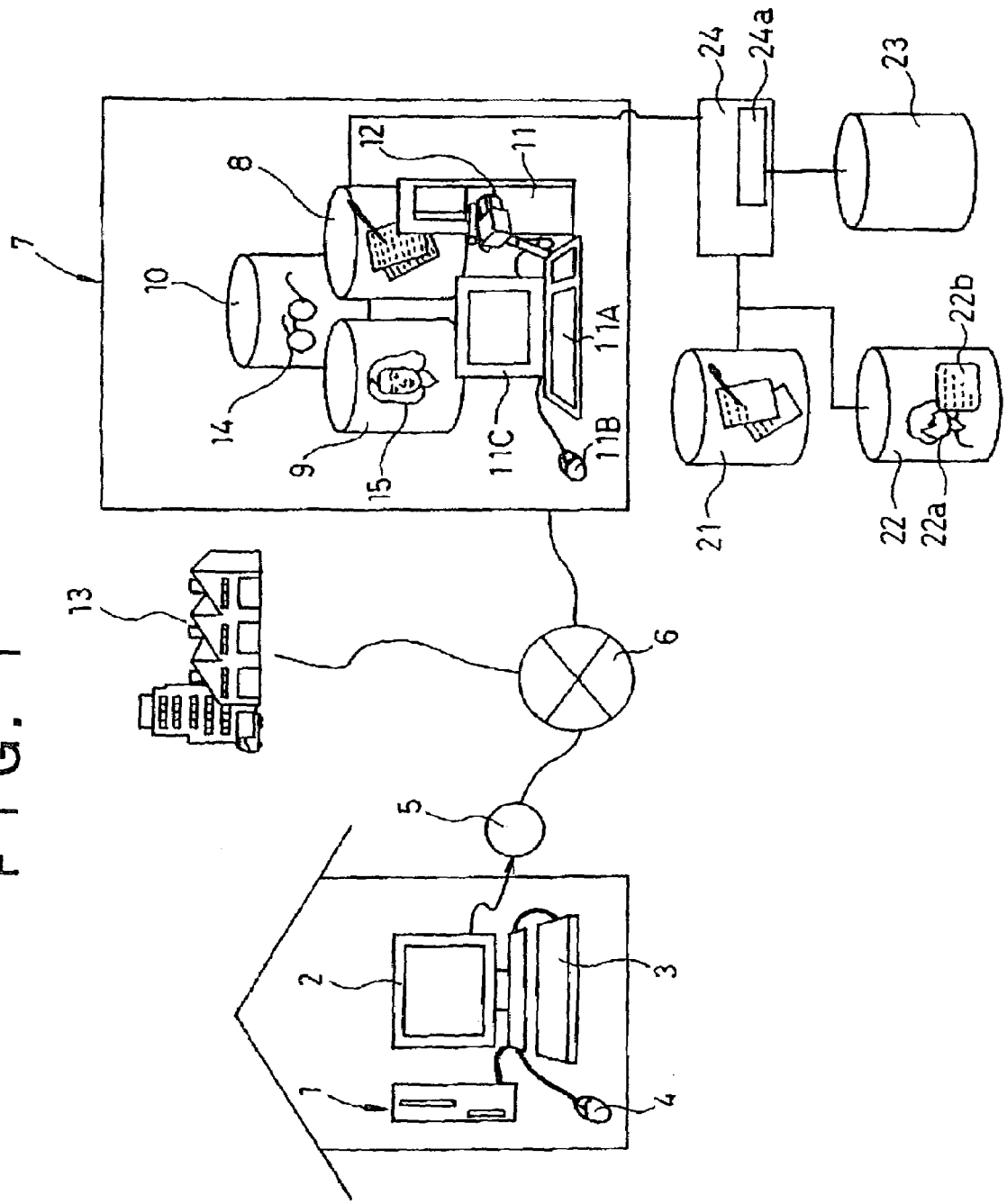
FIG. 1 is a concept view of a database constructing system for eyeglasses relating to a first embodiment.

In FIG. 1, reference numeral 1 is a personal computer which a person possesses, 2 is a monitor, 3 is a keyboard, and 4 is a mouse. The personal computer 1 is connected to the Internet 6 through a provider 5.

Also, 7 is an optician, the optician 7 is provided with a customer managing database server 8, a facial picture information database server 9, an eyeglass frame information database server 10, a web server 11, and a television camera 12. The respective servers 8–11 are connected by LAN, and the television camera 12 is connected to the facial picture information database server 9.

The web server 11 is connected to the Internet 6. At the optician 7, the eyeglass frame information is provided from an eyeglass frame manufacturing maker 13 through the Internet 6, and the eyeglass frame information is successively memorized in the eyeglass frame information database server 10 of the optician 7.

Figure 2A:
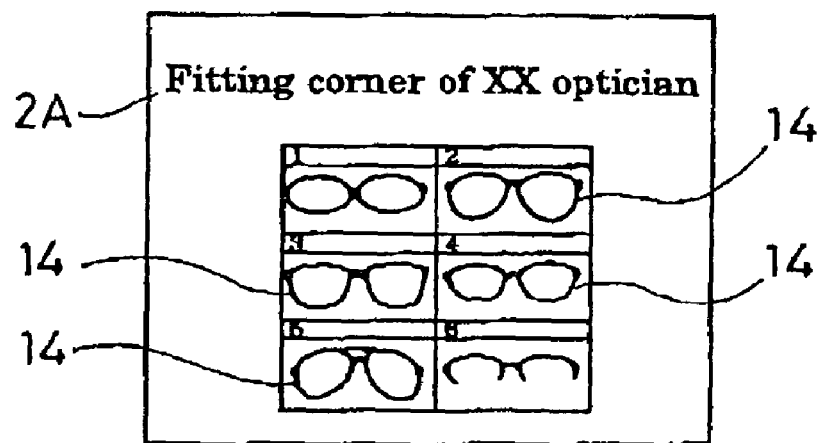
FIG. 2(a) is an explanatory view showing the display state of the monitor screen of the personal computer relating to the first embodiment, and shows the state which a plurality of eyeglass frames are displayed.

The optician 7 opens a homepage, and when a person accesses the homepage of the optician 7 and selects the eyeglass frame fitting corner using the web browser of the personal computer 1, the eyeglass frame fitting corner at the homepage of "XX optician" is displayed on a screen 2A of the monitor 2, for example, as shown in FIG. 2(a), and when the selective screen of an eyeglass frame 14 is specified, the screen is changed, and a plurality of eyeglass frames 14 are displayed on the monitor screen 2A.

There may be employed the composition that on the previous screen to directly display the eyeglass frame 14 on the monitor screen 2A, the screen for inputting material, shape, size, color, maker name, designer name and the like of the eyeglass frame is displayed, and then, the screen is changed to the selective screen of the eyeglass frame 14 after the material, the shape, the size, the frame color, the maker name and the like are inputted.

Also, the input of the eyeglass frame color may be performed not on this screen but on the other screen. Also, in case where the customer wants to find the eyeglass frames having different color among the selected eyeglass frames, it may be searched and displayed what color of the eyeglass frames exist.

Here, the eyeglass frame information database server 10 is provided at the optician 7, but the eyeglass frame information database server 10 is provided at the eyeglass frame manufacturing maker 13, and the eyeglass frame information database server 10 of the eyeglass frame manufacturing maker 13 is linked to the homepage which the optician 7 opens, so that the eyeglass frame information may be displayed on the monitor screen 2A.

The picture synthesis is performed in the server side of the optician 7, and the synthesized picture is transmitted to the personal computer 1.

Figure 3:
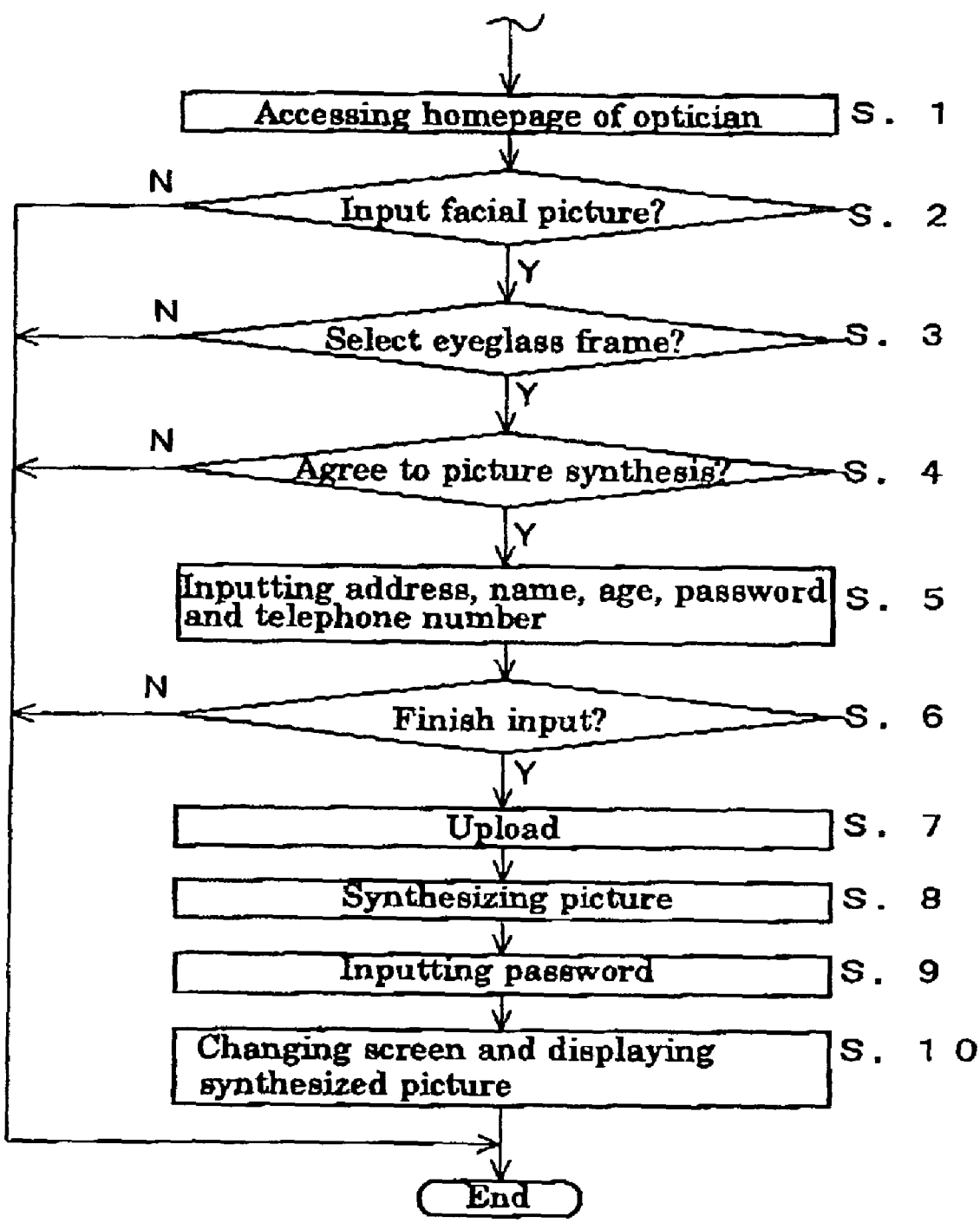
FIG. 3 is a flow chart for explaining the database constructing sequence of the database constructing system for eyeglasses relating to the first embodiment.

Namely, as shown in FIG. 3, when the customer accesses the homepage of the optician 7 through the personal computer 1 (S. 1), the screen is changed to the facial picture inputting screen (S. 2), and when the facial picture is inputted, the screen is changed to the eyeglass frame selecting screen (S. 3), and when the eyeglass frame 14 is selected on the eyeglass frame selecting screen, the screen is changed to the picture synthesis agreeing screen (S. 4), here, the personal information such as address, name, age, telephone number, password, etc. is inputted (S. 5), and when the input is finished (S. 6), the upload of the facial picture is performed (S. 7).

Figure 2B:
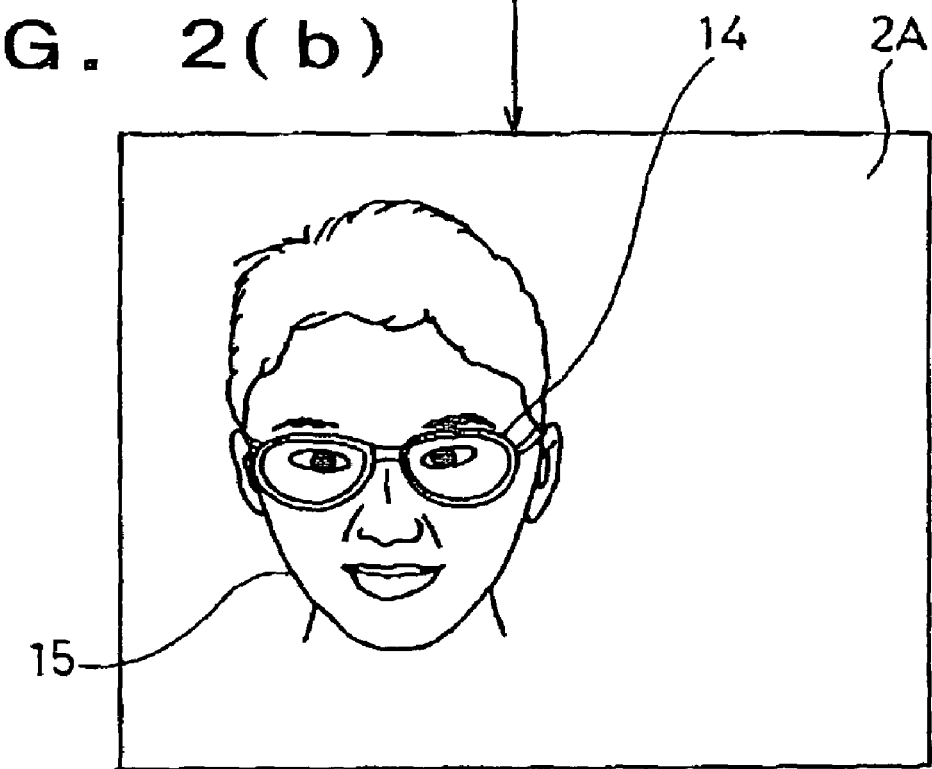
FIG. 2(b) is an explanatory view showing the display state of the monitor screen of the personal computer relating to the first embodiment, and shows the monitor screen displaying the picture that the selected eyeglass frame is synthesized with a facial picture.

At the optician 7, the selected eyeglass frame 14 is synthesized with the facial picture 15 by the selected eyeglass frame 14 and the uploaded facial picture 15 at the web server 11 (S. 8). And, when the password is inputted from the personal computer 1 (S. 9), the facial picture 15 wearing the selected eyeglass frame 14 is displayed on the monitor screen 2A, as shown in FIG. 2(b).

The optician is connected to an eyeglass database server 21 for associating a facial component 22c of a person (a customer reserve or an eyeglass frame interested person) or personal information 22b such as age, sex, etc. with the selected eyeglass frame 14 to memorize the information as a memory means, a personal database server 22 for preserving a personal facial picture 22a or the personal information 22b, and a statistical analyzing means 24 for statistically analyzing a relationship between the personal facial component 22c or the personal information 22b and the selected eyeglass frame 14. The statistical analyzing means 24 comprises an extracting means 24a for extracting the personal facial component 22c from the facial picture 22a, and is connected to a hard disk 23 as a temporary memory means for temporarily preserving a large amount of data in the statistical analyzing process.

The facial picture 22a transmitted from the personal computer 1 is preserved in the personal database server 22. The statistical analyzing means 24 extracts the facial picture 22a preserved in the personal database server 22, statistically analyzes the picture according to the flow chart shown in FIG. 4, associates a type of every facial component 22c with the selected eyeglass frame 14, and preserves the result in the eyeglass database server 21. When the statistical analysis is performed, since a large amount of information needs to be processed, the data are temporarily preserved in the hard disk 23.

Figure 4:
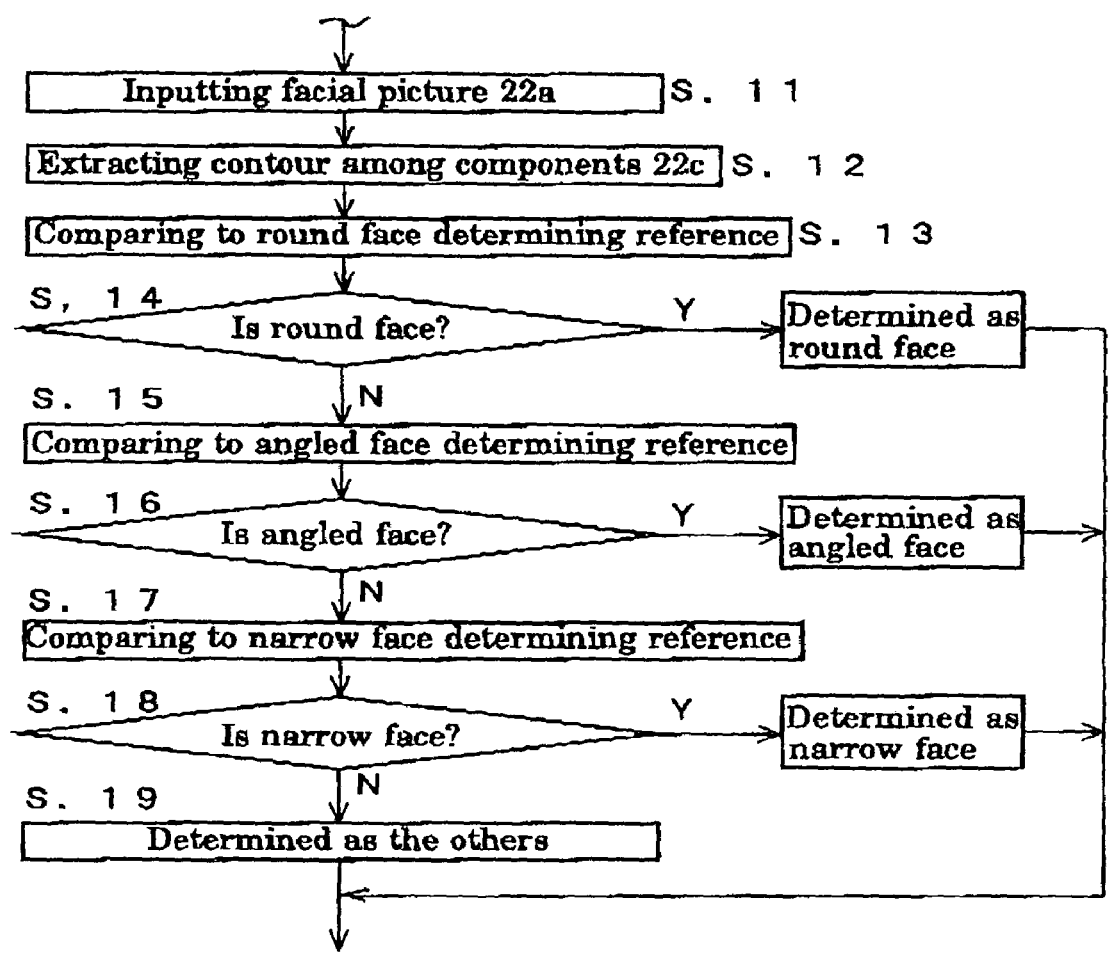
FIG. 4 is a flow chart explaining an example of the statistical analyzing sequence of the statistical analyzing means relating to the first embodiment.

FIG. 4 illustrates an example of the statistical analyzing sequence by the statistical analyzing means 24, and shows the statistical analyzing sequence relating to the contour among the facial components 22c.

When the facial picture 22a is inputted to the statistical analyzing means 24 (S. 11), the extracting means 24a extracts the facial contour by a picture recognition program (S. 12). The statistical analyzing means 24 performs the statistical analysis by comparing successively the contour extracted from the facial picture 22a with a determining reference regarding round face, angled face and narrow face which the statistical analyzing means 24 itself has.

Namely, the inputted facial picture 22a is compared with the round face determining reference (S. 13), and if the facial picture is suitable for the reference, the facial picture 22a is determined as the round face (S. 14). If the facial picture is not determined as the round face, the facial picture 22a is then compared with the angled face determining reference (S. 15), and if the facial picture is suitable for the reference, the facial picture 22a is determined as the angled face (S. 16). If the facial picture is not determined as the angled face, the facial picture 22a is then compared with the narrow face determining reference (S. 17), and if the facial picture is suitable for the reference, the facial picture 22a is determined as the narrow face (S. 18). If the facial picture is not determined as the narrow face, the facial picture is determined as the others (S. 19). As such, the statistical analyzing means 24 statistically analyzes the contour among the components 22c of the inputted facial picture 22a, and classifies that into any type. The statistical analyzing means 24 performs such statistical analysis whenever the facial picture 22a is newly inputted.

FIG. 5 is a concept view showing the association concept of the component 22c of the facial picture 22a with the selected eyeglass frame 14 by the statistical analyzing means 24. As shown in FIG. 5, the statistical analyzing means 24 determines and classifies the personal facial type with respect to not only the contour but also each of the facial components, namely, hair, eyebrows, eyes, nose and mouth. Here, for example, a facial picture of a man A as the person is determined and classified every facial component in this manner that the hair is short, the contour is an angled face, the eyebrows are thin, the eyes are narrow, the nose is a hooked nose and the mouth is large, and if the eyeglass frame which the man A selects was the frame numbers 3 and 12, the eyeglass frames of the frame numbers 3 and 12 are associated with the type of every facial component of the short hair, the angled face contour, the thin eyebrows, the narrow eyes, the hooked nose, and the large mouth.

On the other hand, a facial picture of a woman B as another person is determined and classified every facial component in this manner that the hair is semi-long, the contour is an narrow face, the eyebrows are thin, the eyes are round, the nose is high and the mouth is small, and if the woman B selects the eyeglass frames of the frame numbers 25, 28, 12, the eyeglass frames of the frame numbers 25, 28, and 12 are associated with the type of every facial component of the semi-long hair, the narrow face contour, the thin eyebrows, the round eyes, the high nose, and the small mouth.

Here, any of the man A and the <>woman B selects the eyeglass frame of the frame number 12. Also, when the facial component of the man A are compared with those of the woman B, the eyebrows of the both are determined as thin eyebrows, and the both are common to that point. Thereby, the statistical analyzing means 24 determines that "a person having thin eyebrows likes the eyeglass frame of the frame number 12". The more associated information is, the higher associating accuracy is.

As such, the personal facial component 22c and the selected eyeglass frame 14 are statistically analyzed by the statistical analyzing means 24, and the type of every facial component is associated with the selected eyeglass frame to construct the database, for example, as shown in FIG. 6, a frequency distribution display can be obtained as an example of the statistical display method for associating the facial component with the taste for eyeglass frame. By displaying the frequency distribution on the screen, the relationship between the type of every facial component and the eyeglass frame can be grasped in a moment.

Also, for example, the type of eyeglass frame which are preferred each age group, sex, race, etc. may be grasped by statistical analysis and classification based on not the facial component 22c but the personal information 22b such as the transmitted age, sex, race, etc.

In case where the relationship between the facial component 22c and the eyeglass frame 14 is displayed by the statistical display method, the facial component 22c is associated with the eyeglass frame 14 by the manual input using the keyboard, the mouse and the like, and the relationship may be inputted to the eyeglass database server 21 as the memory means. Though the relationship is not displayed by the statistical display method, the statistical analyzing means 24 can automatically analyze that. For example, the statistical analyzing means 24 is provided with a determining program for automatically determining the eyeglass frame of which the selected frequency is high, and the type of every facial component may be associated with the eyeglass frame.

The eyeglass frame 14 associated with the facial component 22c may be every component of the eyeglass frame subdivided into not the eyeglass frame number but for example, shape, color, material, maker name, designer name, etc. Also, in case where the amount of data to be processed is too much when the eyeglass frame is associated with the type of every personal facial component, the eyeglass frame is associated with only personal characteristic component among the facial components 22c, thereby the amount of processed data can be reduced, and the time for processing the data can be shortened.

Figure 7:
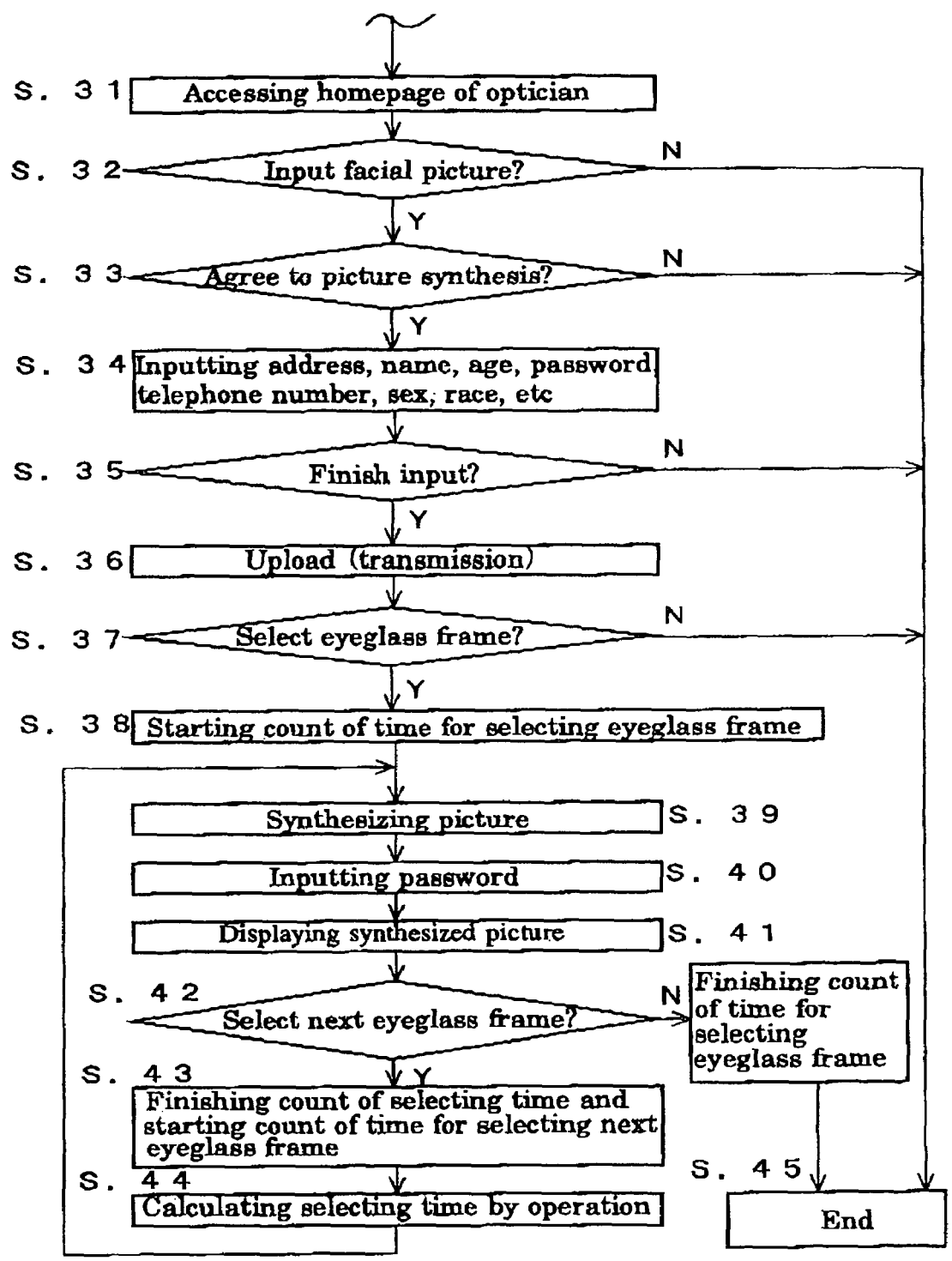
FIG. 7 is a flow chart for explaining another example in the database constructing sequence of the database constructing system for eyeglasses relating to the first embodiment.

Also, as shown in FIG. 7, in case where the person accessing the homepage of the optician selects a plurality of eyeglass frames, by counting the time for selecting each of the eyeglass frames, it can be determined how much the person likes the eyeglass frame, and the preference degree for the selected eyeglass frame can be easily and quantitatively grasped (refer to S. 38-S. 44 among S. 31-S. 44).

In the flow chart shown in FIG. 7, when the person accesses the homepage of the optician (S. 31), inputs the facial picture (S. 32), and agrees to the picture synthesis (S. 33), the screen is changed to allow the personal information such as address, name, age, password, telephone number, sex, race and the like to be inputted (S. 34). When the input of the personal information is finished (S. 35) and the transmission of the facial picture and personal information is finished, the screen is changed again and the selective screen of the eyeglass frame is displayed. Here, when the person selects the eyeglass frame (S. 37), the count of the time for selecting the selected eyeglass frame starts (S. 38), the picture synthesis is performed (S. 39), the person inputs the password (S. 40) so that the synthesized picture of the selected eyeglass frame and the facial picture is displayed (S. 41). When the person confirms the synthesized picture, and then, selects the next eyeglass frame (S. 42), the count of the time for selecting the previously selected eyeglass frame is finished, and simultaneously, the count of the time for selecting the next selected eyeglass frame starts (S. 43). The difference between the count starting time of the next selected eyeglass frame and the count starting time of the previously selected eyeglass frame is operated and calculated, and is set to the time for selecting the previously selected eyeglass frame. When the person inputs the password again (S. 40), the synthesized picture of the next selected eyeglass frame and the facial picture is displayed (S. 41), and the person judges to select the eyeglass frame (S. 42).

As mentioned above, by repeating the selection of the plurality of eyeglass frames, the time for selecting the selected eyeglass frames can be calculated, respectively, and when the selecting time becomes longer, it can be judged that the person likes the eyeglass frame much more.

Also, in case where the person accessing the homepage of the optician selects a plurality of eyeglass frames, by managing a selecting order and selecting history of the selected eyeglass frames, for example, when the person selects an eyeglass frame different from the previously selected eyeglass frame and then selects the same as the previously selected eyeglass frame again, it can be considered that the person likes the previous eyeglass frame which was selected several times, and the preference degree for the selected eyeglass frame can be grasped.

Figure 8:
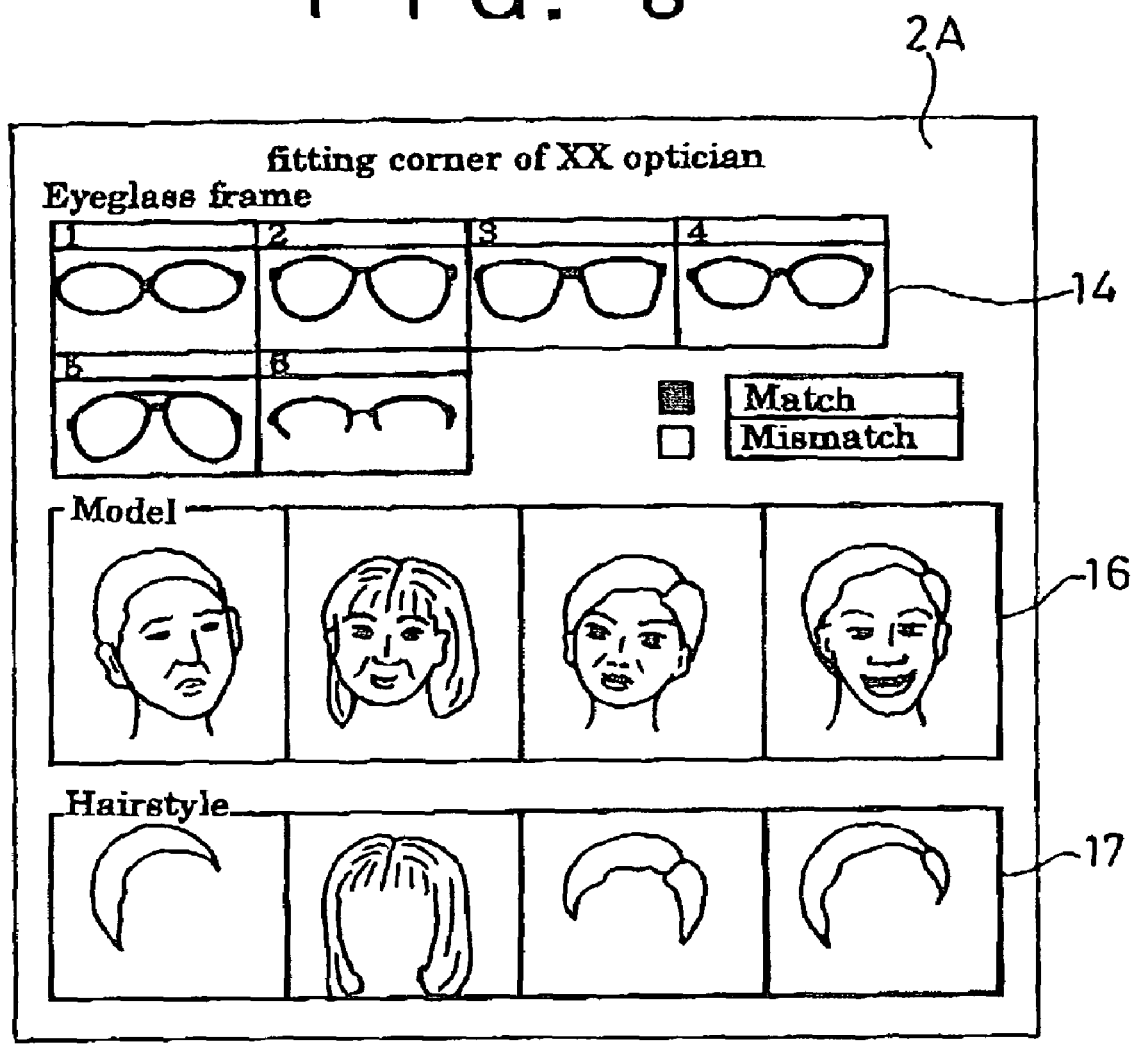
FIG. 8 illustrates the eyeglass frame displayed on the monitor screen of the personal computer accessed the homepage of the optician and the model's facial picture.

Also, in the present invention, the selected eyeglass frame 14 was worn to a personal facial picture 15, but as shown in FIG. 8, when the person accesses the homepage of the optician 7 and selects the fitting corner of the eyeglass frame 14, a facial picture 16 and a hairstyle 17 of a model together with the plurality of eyeglass frames 14 are displayed on the monitor screen 2A, the eyeglass frame 14, the facial picture 16 and the hairstyle 17 of the model are successively selected, and the selected eyeglass frame 14, the facial picture 16 and the hairstyle 17 of the model may be displayed on the monitor screen 2A when displaying the synthesis.

Here, if the facial picture in which the facial characteristic portion is emphasized is prepared as a model's facial picture, it is preferable that the facial characteristic portion and aesthetic harmony relationship between the facial characteristic portion and the eyeglass frame can be automatically collected. In this case, if well-matched or ill-matched is selected by a radio button on the screen which the model's facial picture is synthesized with the selected eyeglass frame, reliability of the collected aesthetic harmony relationship is improved.

Since the person accesses the homepage of the optician using the personal computer 1 at his/her own home to perform the above-mentioned database construction for eyeglasses, a large amount of personal information can be automatically obtained without being limited to the customer to visit the optician, and since the association by the statistical analysis or the data preservation can be near automatically performed, the database for eyeglasses can be effectively constructed without trouble.

In the first embodiment, the database constructing system for eyeglasses is described, but in the homepage which the personal goods to wear or carry store such as handbag, shoes, accessories such as necklace, cap, etc. opens, if a facial picture, a half-length picture, or a whole body picture of a person is transmitted and the desired personal goods to wear or carry are selected, it is also possible to automatically construct the database for the personal goods to wear or carry.

According to the first embodiment, the information from a large number of persons can be automatically collected without being limited to the customer to visit the store, and the database can be constructed by associating the personal goods to wear or carry that the person likes with the personal characteristics. Particularly, in the optician, since the type of eyeglass frame that the person likes is almost automatically associated and classified every personal facial component, the personal facial type and the eyeglass frame trend that the person likes can be easily grasped, and a large amount of eyeglass database can be automatically and effectively constructed.

Second Embodiment

Here, the web server 11 comprises an extracting means for extracting the component from the customer's facial picture and a selecting means. The extracting means of the statistical analyzing means 24 may be used as the extracting means. As the customer's facial picture, the facial picture obtained by photographing the face of the customer to visit the optician by the television camera 12 may be used or his/her own facial picture transmitted when the customer orders the eyeglass frame on the eyeglass frame order screen at his/her own home may be used.

Figure 9:
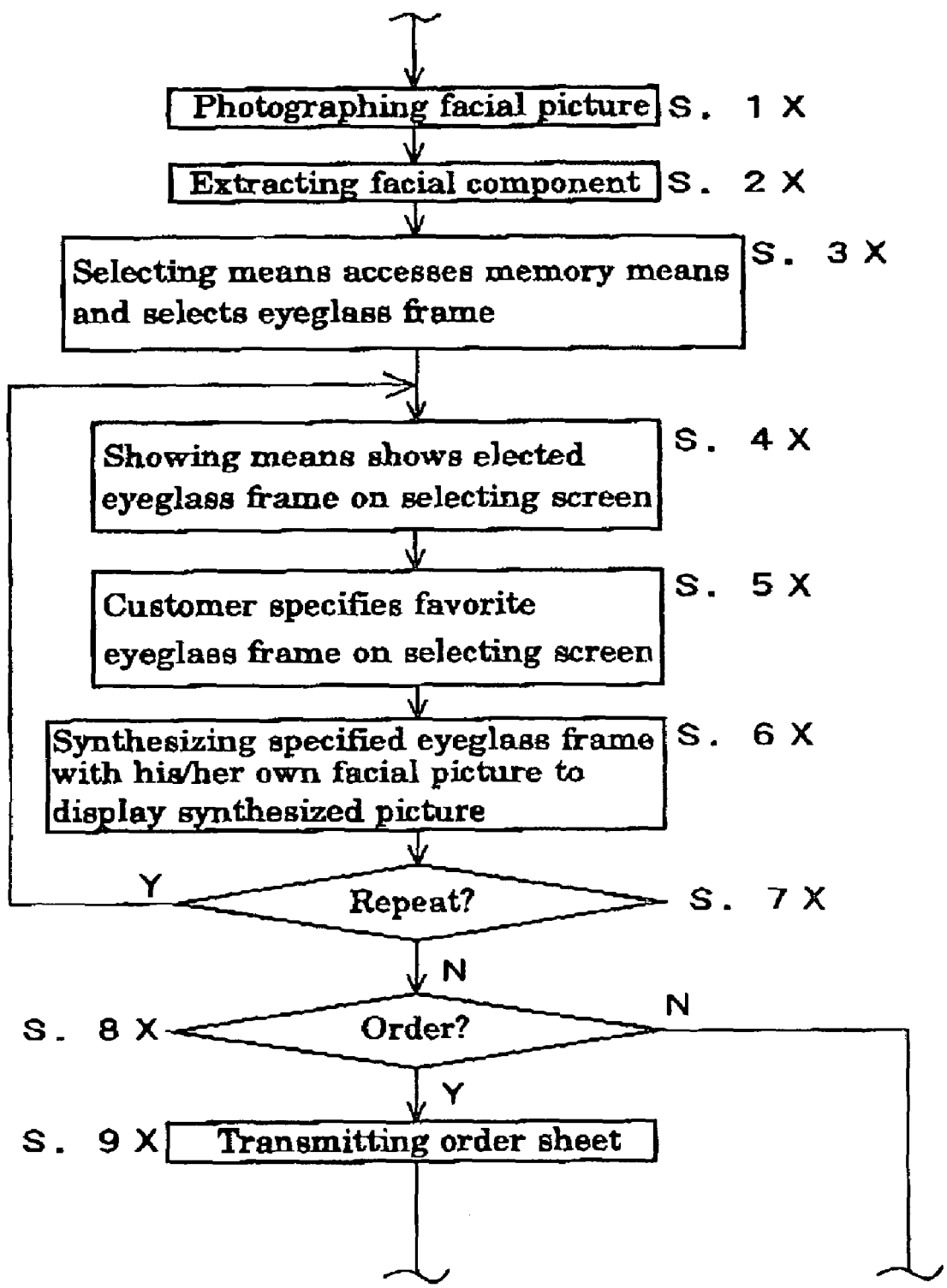
FIG. 9 illustrates an example of the flow chart of the eyeglass frame selecting service system relating to a second embodiment.

In case of the customer to visit the optician 7, as shown at S. 1X in FIG. 9, after the facial picture is photographed using the television camera 12, a decision button of a keyboard 11A is handled or a mouse 11B is clicked so that extraction of facial component way be performed (refer to S.

2X). When the facial component is extracted, the selecting means accesses a memory means 21, determines the facial component by type, and selects the associated eyeglass frame (refer to S. 3X). The web server 11 functions as a showing means, and shows the selected eyeglass frame on a screen 11c (refer to S. 4X). The customer specifies a favorite eyeglass frame among the selected plurality of eyeglass frames on the screen 11c (refer to S. 5X). If so, the eyeglass frame is synthesized with his/her own facial picture so that the synthesized picture is displayed on the screen 11c (refer to S. 6X).

With repeating the above-mentioned operations (refer to S. 4X–S. 7X), when an order button is clicked on the screen 11c (refer to S. 8X) in case where there is a really favorite eyeglass frame, an order sheet for the eyeglass frame is transmitted to the eyeglass frame maker 13 as electronic data (refer to S. 9X). Simultaneously, the eyeglass frame is associated with the type of the facial component to be memorized in the memory means 21 so that richness of the associated information is accomplished.

Figure 10:
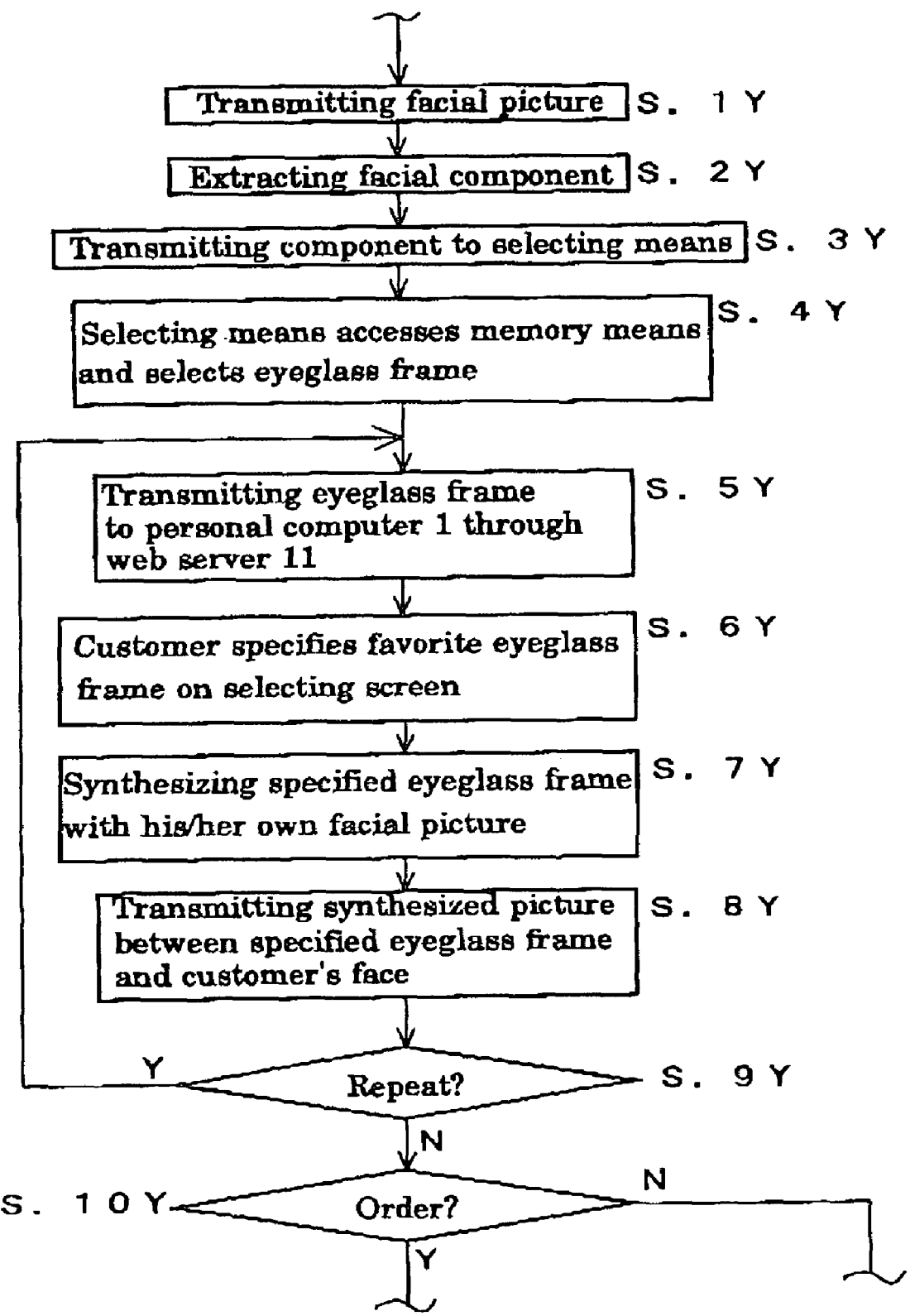
FIG. 10 illustrates another example of the flow chart of the eyeglass frame selecting service system relating to the second embodiment.

In case where the customer orders the eyeglass frame at his/her own home, as shown at S. 1Y in FIG. 10, the facial picture is transmitted, and simultaneously, the extracting means of the web server 11 extracts automatically the facial component transmitted (refer to S. 2Y), and transmits the facial component to the selecting means (refer to S. 3Y). The selecting means accesses the memory means 21, selects the eyeglass frame 14 associated with the facial component (refer to S. 4Y), and transmits the selected plurality of eyeglass frames 14 to the personal computer 1 through the web server 11 (refer to S. 5Y).

The customer specifies the favorite eyeglass frame among the plurality of eyeglass frames 14 displayed on the screen 2A, as shown in FIG. 11 (refer to S. 6Y). When the eyeglass frame is specified, the web server 11 synthesizes the specified eyeglass frame with the customer's facial picture, and transmits the synthesized picture to the customer (refer to S. 7Y, S. 8Y).

The customer judges whether the eyeglass frame is suitable or not by a synthesized picture 26, as shown in FIG. 12, and in case where the eyeglass frame is not suitable, the customer repeats the specifying operation several times (refer to S. 9Y), and in case where the eyeglass frame specified finally is suitable, the customer orders the favorite eyeglass frame (refer to S. 10Y).

According to the second embodiment, since the service that an eyeglass frame is not selected among a plurality of eyeglass frames 14 shown in the showcase of the optician 7, but the plurality of eyeglass frames which seem to be preferred or suitable are selected and shown and the eyeglass frame is specified among the shown eyeglass frames is performed, it is convenient for a customer to select the eyeglass frame without hesitation and to save trouble for searching a favorite eyeglass frame.

Also, though the optician 7 does not receive the customer as counter selling, since the customer can calmly select the eyeglass frame 14 until he/she finds the favorite eyeglass frame, reception for the customer can be performed without damaging the service for the customer so that the service is further improved.

Also, when a new eyeglass frame 14 is obtained, with respect to the customer whose facial picture is registered, if the eyeglass frame associated with the characteristic information on the customer's face is synthesized with the facial picture and the facial picture synthesized with the eyeglass frame is attached to an electronic mail to be transmitted to the customer, the customer's purchase desire is improved.

Namely, the newly obtained eyeglass frame 14 is divided to the component such as shape, size, material, color, etc., the customer's facial picture associated with the component is extracted, and the newly obtained eyeglass frame can be guided to only the customers associated with the eyeglass frame 14 by the electronic mail, and thus, advertisement effect having high purchase certainty can be expected.

Here, the aesthetic harmony relationship between the facial characteristic portion and the eyeglass frame is automatically collected, but the aesthetic harmony relationship between the facial characteristic portion and the eyeglass frame is scientifically analyzed, and the association of the facial characteristic portion and the eyeglass frame may be preserved.

For example, as a facial shape, there are an narrow face, a large face, a narrow forehead, a broad forehead and the like, and in case where the facial shapes are classified into four types of contours such as round, triangle, quadrangle and narrow, it is said that a round eyeglass frame and a smallish eyeglass frame emphasizes round face and a thick eyeglass frame having angled line is preferred in view of the aesthetic harmony relationship. Also, in case of a person having a triangle face, a large and heavy eyeglass frame emphasizes a thin jaw line, and an angled eyeglass frame or an eyeglass frame largely widen toward the outside is not preferred in view of the aesthetic harmony relationship, and a roundish eyeglass frame is preferred. Also, since a person having a quadrilateral face gives hard image, an angled eyeglass frame, a heavy eyeglass frame or a narrow and small eyeglass frame makes the face look like larger face, and thus, those are not preferred, and somewhat large roundish eyeglass frame is preferred. Any type of eyeglass frame suits a person having an narrow face.

Also, various kinds of relationships such as relationship between the eyeglass frame size and the location of eyes, distance between the eyebrows and the eyeglass frame, and aesthetic harmony relationship between the eyebrows and the eyeglass frame shape are scientifically analyzed. And, if there is provided the composition that the relationship between the characteristic portion among the facial components and the eyeglass frame is artificially determined from a scientific point of view to perform the association, and the characteristic portion is extracted from the personal facial picture transmitted through the Internet, and the eyeglass frame associated with the characteristic portion is selected and the plurality of eyeglass frames which seem to be suitable are shown, troubles can be much more saved than that the customer searches an eyeglass frame which suits himself/herself among a plurality of eyeglass frames.

Also, since the eyeglass frames which are selected and shown are the eyeglass frames having high certainty for suiting the person, service can be further improved much more.

As described above, in the second embodiment, the facial characteristics is used for meaning one of the facial components, for example, in case of nose, "a nose is high", etc., but in case of facial characteristics, combination of the facial component, for example, "contour is an narrow face, eyebrows are narrow, eyes are round, a nose is high, and a mouth is small" is also included.

According to the second embodiment, the eyeglass frame which seems to suit the customer or the eyeglass frame which the customer seems to like can be automatically picked up to be shown to the customer.

As such, the present embodiment was described, but there may be provided the composition that information on eyeglass frame and items for inputting facial characteristic portion are shown to a web server, data for associating the characteristic portion with the selected eyeglass frame is collected by data based on the input items of the facial characteristic portion transmitted to the web server by using a web browser and information on eyeglass frame selected by a person, the relationship between the facial characteristics and the selected eyeglass frame is analyzed statistically by a statistical analyzing means, and the facial characteristics is associated with the selected eyeglass frame to be preserved. Also, in order to extracting a selective trend by the personal characteristics, that is, an occupation (a sales, a engineer, an office work, a driver, a housewife, a woman office worker), age (generation), or sex, or a trend according to difference of a personal taste, lifestyle and the like as well as the facial characteristics, a check box may be prepared to be inputted.

Initially, this system predicts and registers in advance the frames which seem to be preferred, and shows various kinds of candidates to a user, but as users are increased, suggesting system of recommendation is improved.

As the personal goods to wear or carry to be associated, there are ornaments such as eyeglasses, ring and necklace, clothes, shoes, bag, etc.

Third Embodiment

Figure 13:
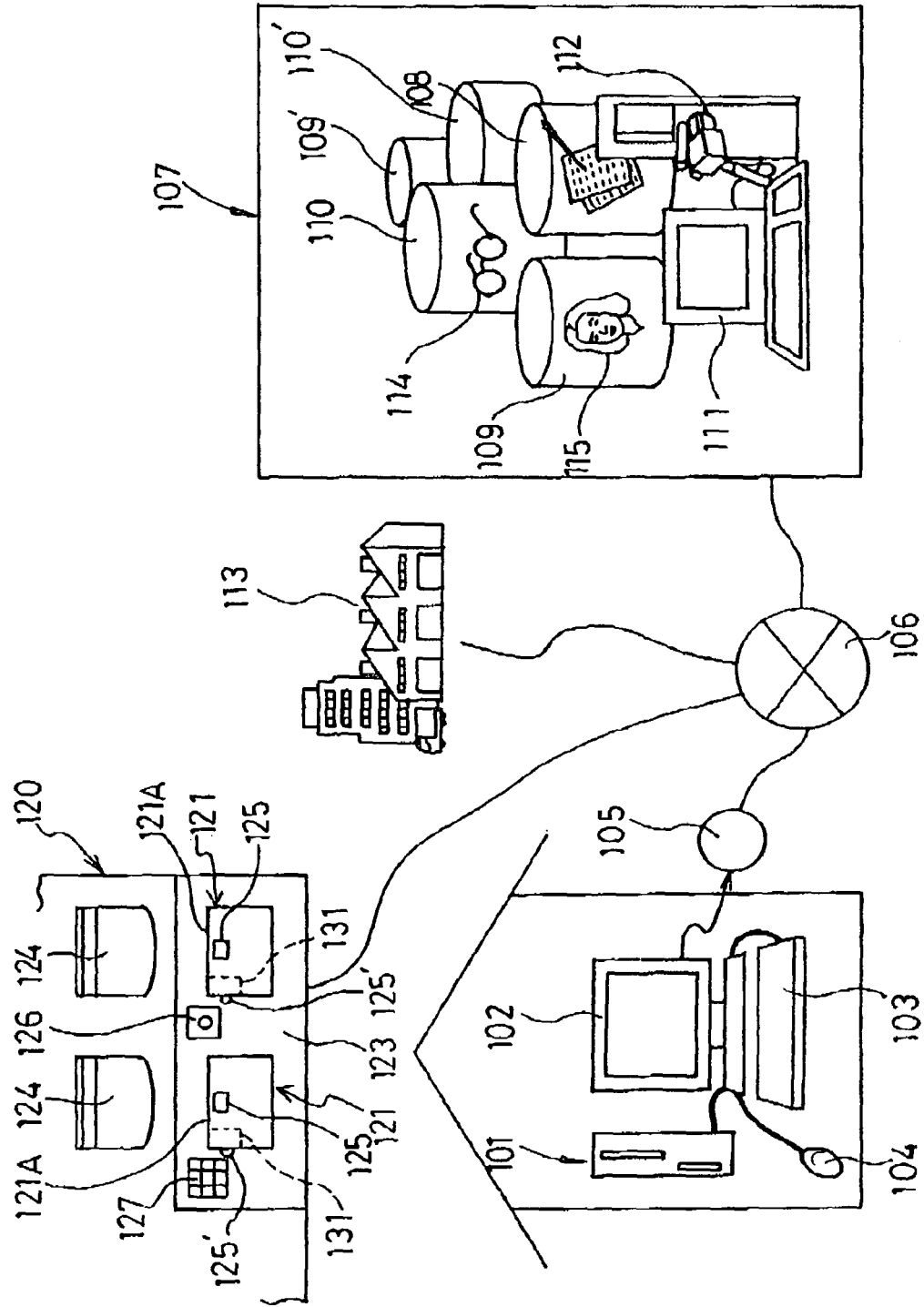
FIG. 13 is a concept view of the eye test service system relating to a third embodiment.

In FIG. 13, 101 is a personal computer (terminal) which a person possesses, 102 is a monitor, 103 is a keyboard, and 104 is a mouse. The personal computer 101 is connected to the Internet 106 through a provider 105.

Also, 107 is an optician, the optician 107 is provided with a customer managing database server 108, a facial picture information database server 109, an eyeglass lens database server 109', an eyeglass frame information database server (an eyeglass frame data memory means) 110, an eye test data database server (an eye test data memory means) 110', a web server 111, and a television camera 112. Each of the servers 108–109, 109', 110, 110', 111 is connected by LAN, and the television camera 112 is connected to the facial picture information database server 109. The web server 111 has a selecting means for selecting an eyeglass frame, a selecting means for selecting an eyeglass lens, and a picture synthesizing means for synthesizing the selected eyeglass frame with a facial picture.

The web server 111 is connected to the Internet 106. At the optician 107, an eyeglass frame information is provided from an eyeglass frame manufacturing maker 113 through the Internet 106, and the eyeglass frame information is successively preserved in the eyeglass frame information database server 110 of the optician 107.

Figure 18:
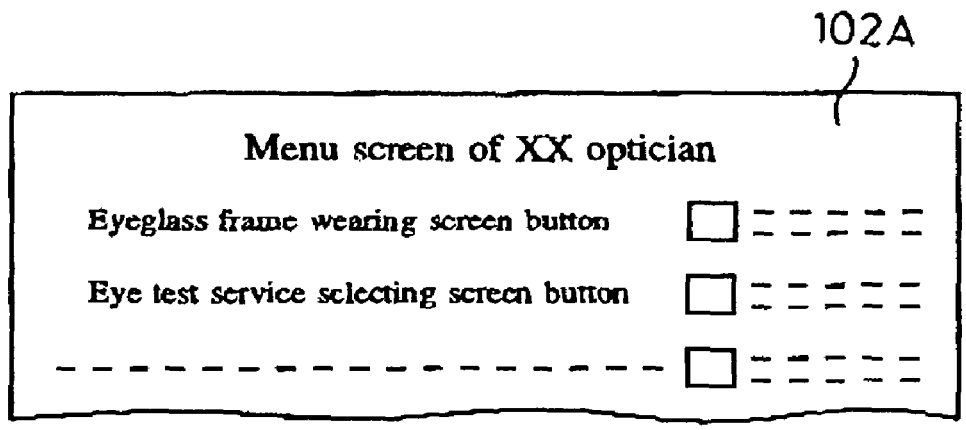
FIG. 18 illustrates an example of the menu screen of the eye test service system relating to the third embodiment.

The optician 107 opens a homepage. On a menu screen of the homepage, for example, an eye test service selecting screen button, an eyeglass frame wearing screen button and other screen selecting buttons are displayed, and the explanations thereof are displayed, as shown in FIG. 18.

Figure 14A:
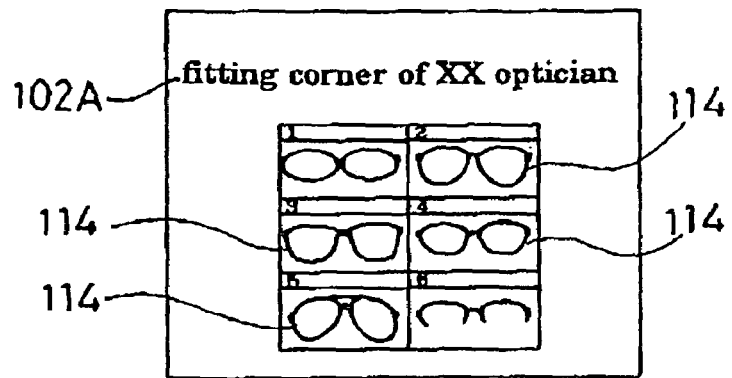
FIG. 14(a) is an explanatory view showing the display state of the monitor screen of the personal computer relating to the third embodiment, and shows the state which a plurality of eyeglass frames are displayed.

When a person accesses the homepage of the optician 107 to press the eyeglass frame wearing button by using a web browser of the personal computer 101, an eyeglass frame fitting corner in the homepage of "XX optician" is displayed on a screen 102A of a monitor 102, for example, as shown in FIG. 14(a), and when a selective screen for an eyeglass frame 114 is specified, the screen is changed, and a plurality of eyeglass frames 114 are displayed on the monitor screen 102A.

On the monitor screen 102A, it is inquired whether a picture synthesizing program for synthesizing the eyeglass frame 114 with a facial picture is needed or not, and in case where the picture synthesizing program is needed, the picture synthesizing program is downloaded.

Figure 14B:
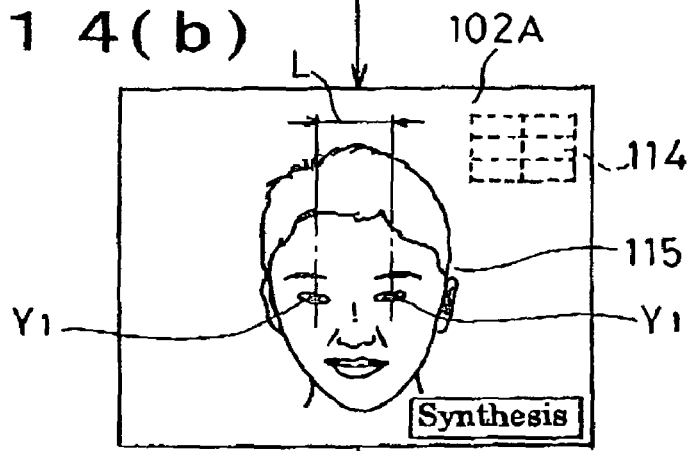
FIG. 14(b) is an explanatory view showing the display state of the monitor screen of the personal computer relating to the third embodiment, and shows the state that the facial picture inputted to the personal computer is displayed.
Figure 14C:
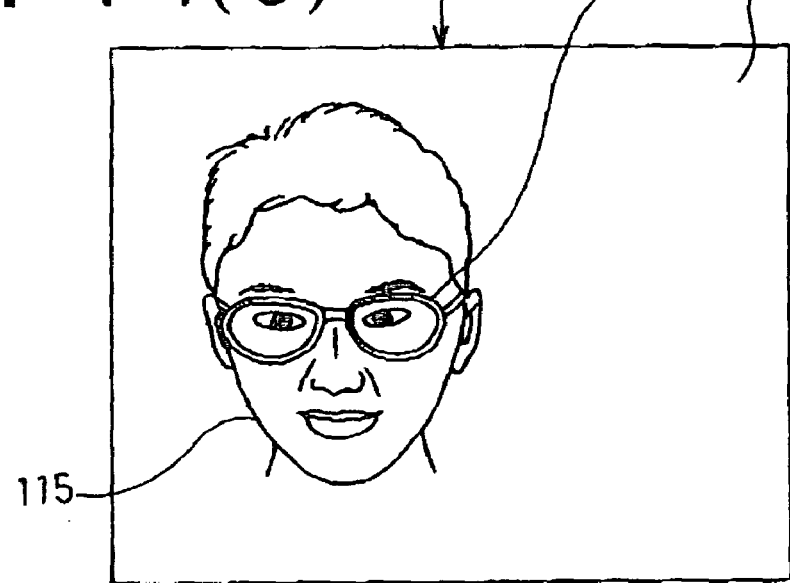
FIG. 14(c) is an explanatory view showing the display state of the monitor screen of the personal computer relating to the third embodiment, and shows the monitor screen on which the eyeglass frame is synthesized with the facial picture to display the synthesized picture.

The person inputs his/her own facial picture to allow a facial picture 115 to be displayed on the monitor screen 102A, as shown in FIG. 14(b), specifies two points Y1, Y1 on the screen, and inputs an actual distance between the two points Y1, Y1 through the keyboard 103. Next, when the eyeglass frame 114 is selected and the synthesizing button is handled, a photographing magnification of the facial picture for the eyeglass frame 114 is adjusted by an operating means, and the facial picture 115 wearing the selected eyeglass frame 114 is synthesized and displayed on the monitor screen 102A, as shown in FIG. 14(c).

Figure 15:
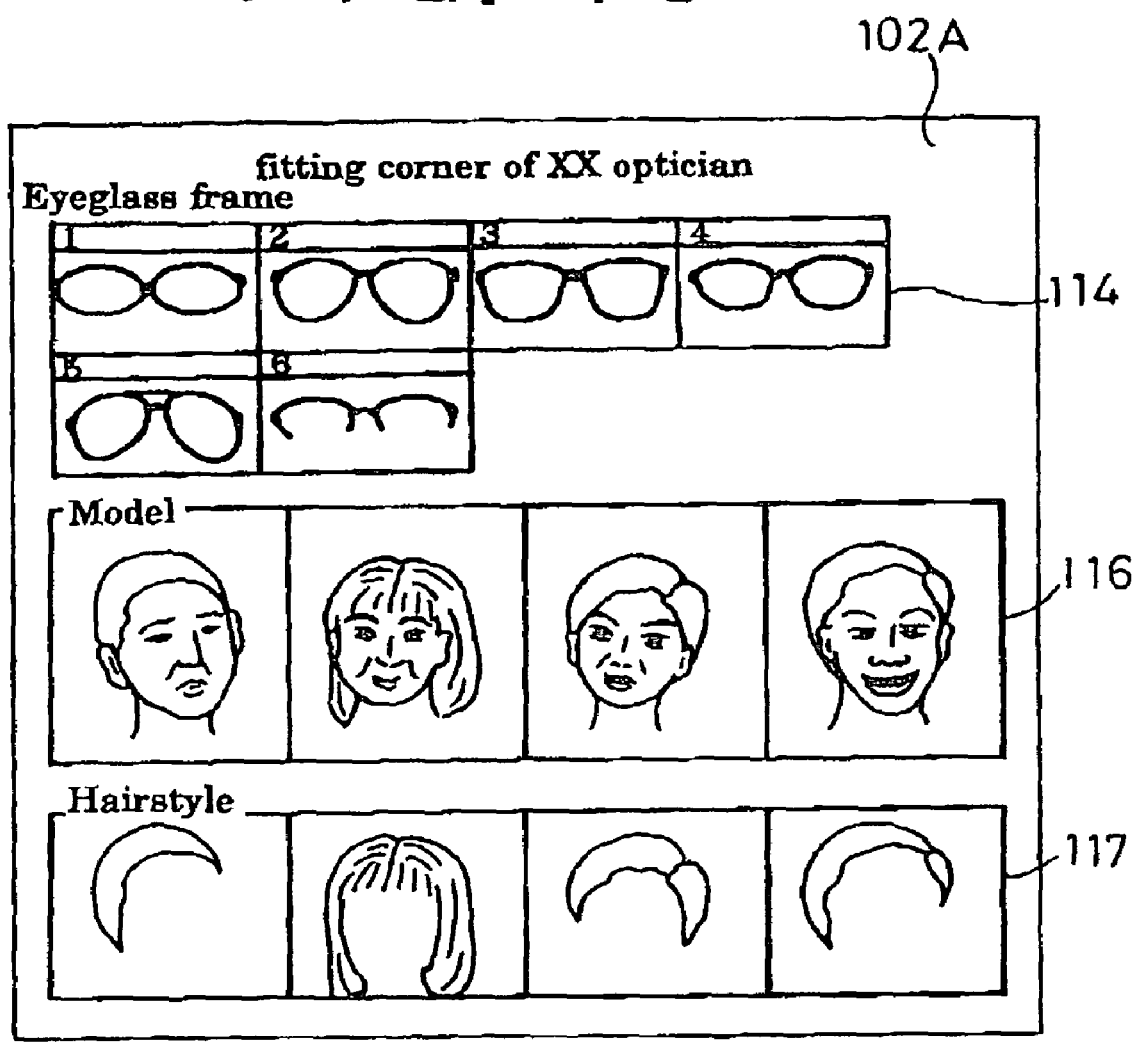
FIG. 15 illustrates the eyeglass frame displayed on the monitor screen of the personal computer accessed the homepage of the optician and the model's facial picture.

Also, the selected eyeglass frame 114 is worn to the personal facial picture 115, but as shown in FIG. 15, when the person accesses the homepage of the optician 107 and selects the fitting corner of the eyeglass frame 114 and a facial picture 116 and a hairstyle 117 of a model together with a plurality of eyeglass frames 114 are displayed on the monitor screen 102A, and the person selects successively the eyeglass frame 114 and the facial picture 116 and the hairstyle 117 of the model and instructs the synthesis, the facial pictures of the selected eyeglass frame 114 and the facial picture 116 and the hairstyle 117 of the model are displayed on the monitor screen 102A.

In addition, the optician 107 is connected with an eye test service apparatus 121 provided at an eye test service equipment 120 through the Internet 106, as shown in FIG. 13. Here, the eye test service equipment 120 is, for example, the equipment provided at a station yard, a rest room of a supermarket, a convenience store, a waiting room of a hospital, a waiting room of an optician, a waiting room of a public facilities, a lounge, a lobby of a bank and the like.

Figure 16:
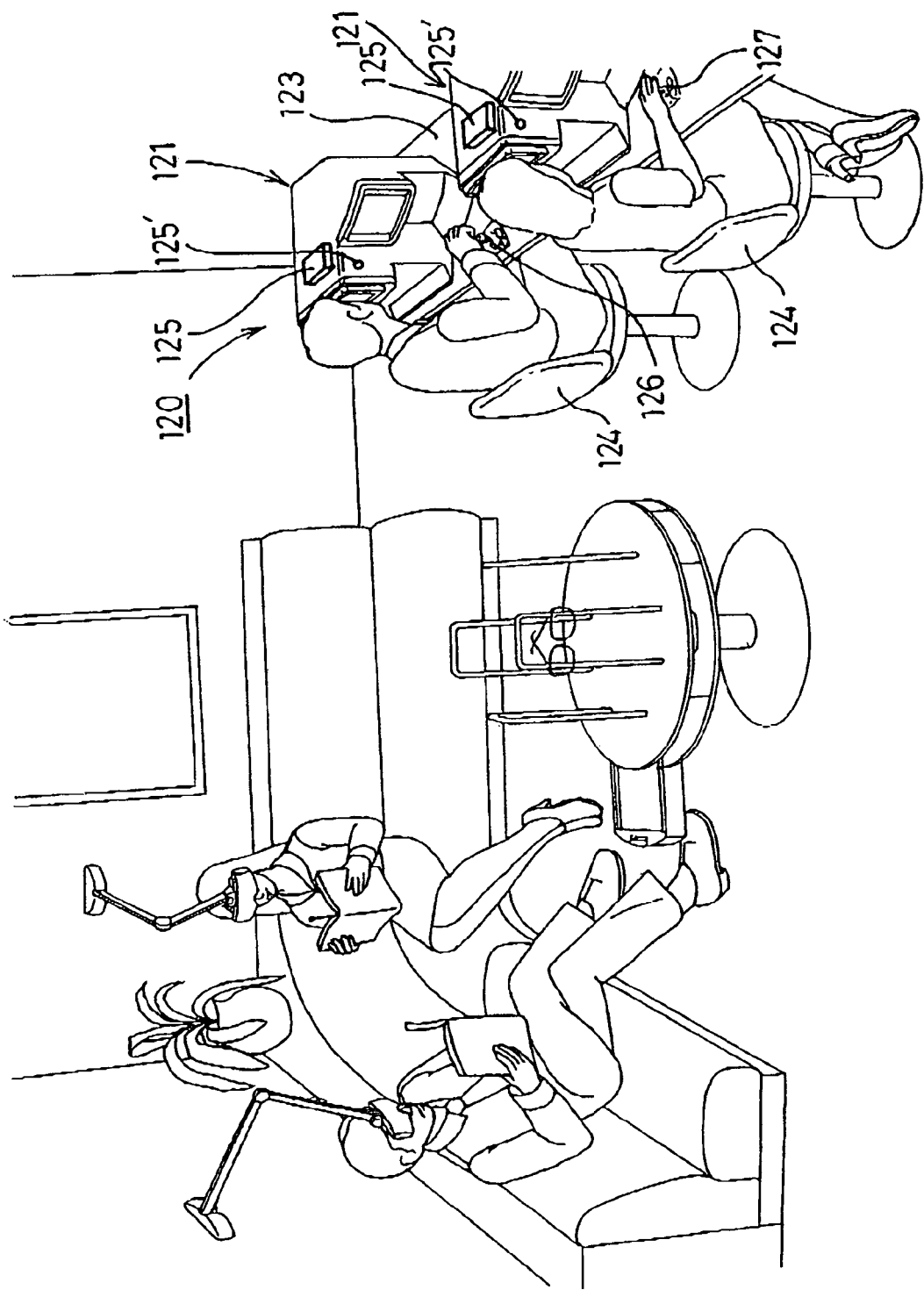
FIG. 16 is a schematic view for explaining a scene of the eye test service equipment relating to the third embodiment.

The eye test equipment 120 adopts the equipment provided, for example, at a waiting room of a large-scale private hospital. FIG. 16 is a perspective view showing the scene of the waiting room, the eye test service equipment 120 is provided at a corner of the waiting room, and the eye test service equipment 120 is provided with a table 123 and a chair 124 for installing the eye test service apparatus 121.

Here, as the eye test service apparatus 121, autorefractometer or lens meter for performing the eye test for subjective and objective purpose is provided.

In an upper part of the eye test service apparatus 121, a photographing camera 125 is integrally attached, and on a front surface thereof, a human body detecting sensor 125' is provided. The eye test service equipment 121 automatically returns from a power saving mode to a power mode when a user sits down on the chair 124.

The photographing camera 125 is, for example, a wide angle camera, and photographs the facial picture of a service user for using the eye test service apparatus 121 sitting down on the chair 124.

Right next to the eye test service apparatus 121, a handling joystick 126 and a handling touch panel 127 are provided. The user puts his/her jaw on a jaw support (not shown) of the eye test service apparatus 121, puts his/her forehead to a forehead band (not shown) to fix his/her face, and handles the handling joystick 126 or the handling touch panel 127 to fix a location of eyes himself/herself.

Figure 17:
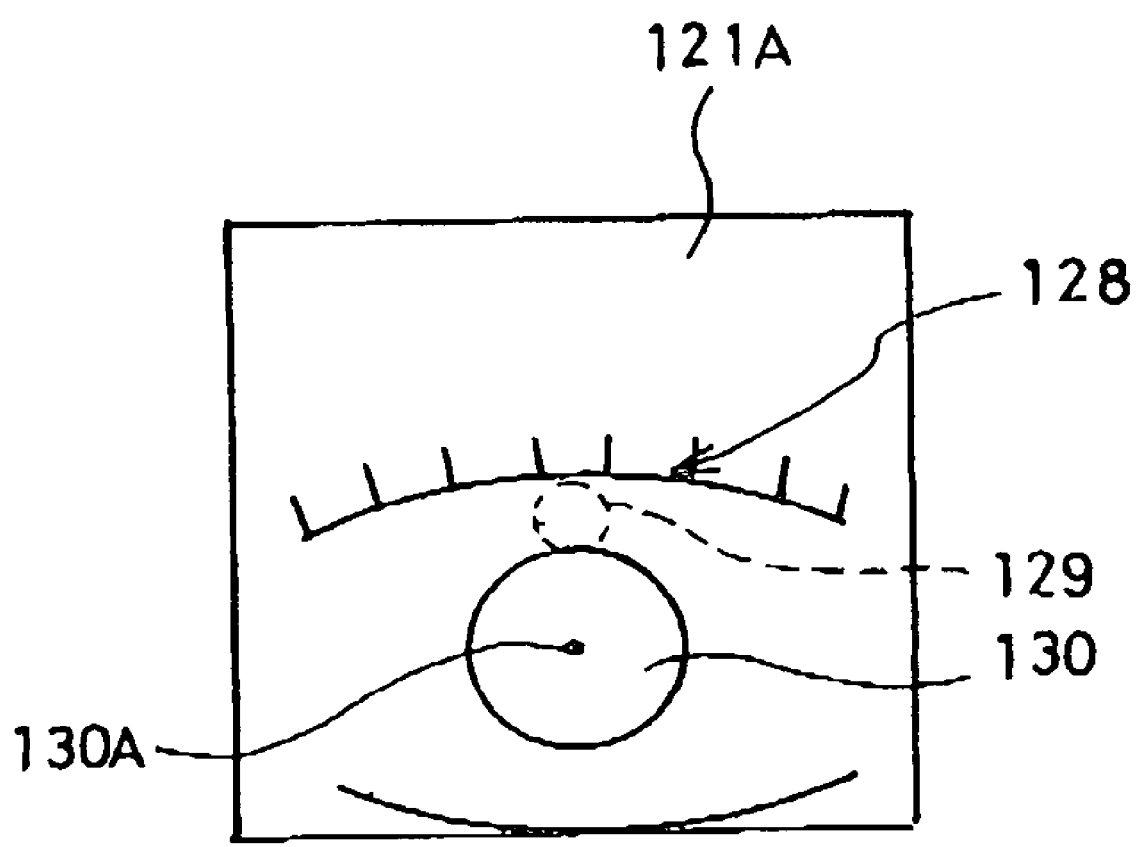
FIG. 17 is an explanatory view of the rough alignment using the eye test service apparatus of the eye test service system relating to the third embodiment.

As shown in FIG. 17, an anterior eye part image 128 of an objective eye is shown on the screen 121A of the eye test service apparatus 121, and as shown in FIG. 17, when a center 130A of a pupil 130 is beyond the range of an alignment allowable mark 129, the handling joystick 126 or the handling touch panel 127 is handled such that the center 130A of the pupil is within the range of the alignment allowable mark 129. Thereby, the rough alignment for aligning the objective eye to an optical axis of the apparatus body is completed.

In case of a user poor at the handling, a service man at a separate place may guide and handle the rough alignment if necessary.

For example, in case where the eye test service equipment 120 is provided at the waiting room of the optician 107, a monitor room (not shown) is connected with the eye test service equipment 120 by LAN, and the anterior eye part image 128 is transmitted to a monitor in the monitor room, and in case where it takes a user a long time to handle the rough alignment, if a handling direction of the eye test service apparatus 121 which a user performing the handling uses is announced from the monitor room or an indicating message of the handling direction is displayed on the screen 121A, the time required for handling the rough alignment can be shortened.

When the rough alignment of the objective eye is completed, the eye test service apparatus 121 performs automatically the alignment of optical axis of the apparatus for the objective eye, and the eye refractive power of the objective eye is measured in the known sequence, and an objective eye test data is obtained. Also, a subjective eye test data is obtained in the known sequence.

As shown in FIG. 13, the eye test service apparatus 121 is provided with a print apparatus 131 as an issue apparatus, and when the handling joystick 126 or the handling touch panel 127 is handled and the measurement end is performed after these eye test data are measured, the eye test data, a user ID and a user password are printed out by the print apparatus 131. Simultaneously, the user's facial picture 115, the eye test data, the user ID, and the user password are transmitted to the neighboring optician 107 through the Internet 106. The facial picture and the user password are preserved in the facial picture information database server 109, and the eye test data and the user ID are preserved in the eye test data database server 110'.

Here, the issue of the user ID and the user password is based on the next reason.

Namely, the eye test service system can be constructed such that the selection of the eyeglass lens and the eyeglass frame are performed at the eye test service corner, however, since the selection of the eyeglass lens and the eyeglass frame are arbitrary, it is decided by a plurality of trials, and it takes a long time to make a decision, and thus, if the selection is performed at the eye test service equipment 120, the waiting time becomes long, and the using efficiency of the eye test service equipment 120 is lowered.

Here, the user's facial picture is called out only by using the user password, and since there is provided the composition that the own facial picture is called out only by using the user password, other person cannot indiscriminately call out and peep the user's facial picture, and the user's privacy can be secured. Also, if the system manager side cannot see the service user's facial picture due to the password lock, the privacy is further secured.

Here, the user ID and the user password are issued together with the measurement end, but with inputting the user's mail address, the user ID and the user password may be issued. The mail address is preserved in the customer managing database server 108 of the optician 107, and is provided to use of a direct electronic mail issue.

Also, the user ID and the user password were issued and transmitted to the optician 107 together with the facial picture and the eye test data, but with inputting the mail address of the personal computer 101 which the user possesses, the facial picture data may be transmitted as an attached file to the personal computer 101 at his/her home by the transmitting means.

In this manner, since the facial picture is not transmitted to the optician 107, the user's privacy is further secured.

The user brings the printed user ID and user password to his/her home, and operates the personal computer 101 at his/her home to access the homepage of the optician 107.

Figure 19:
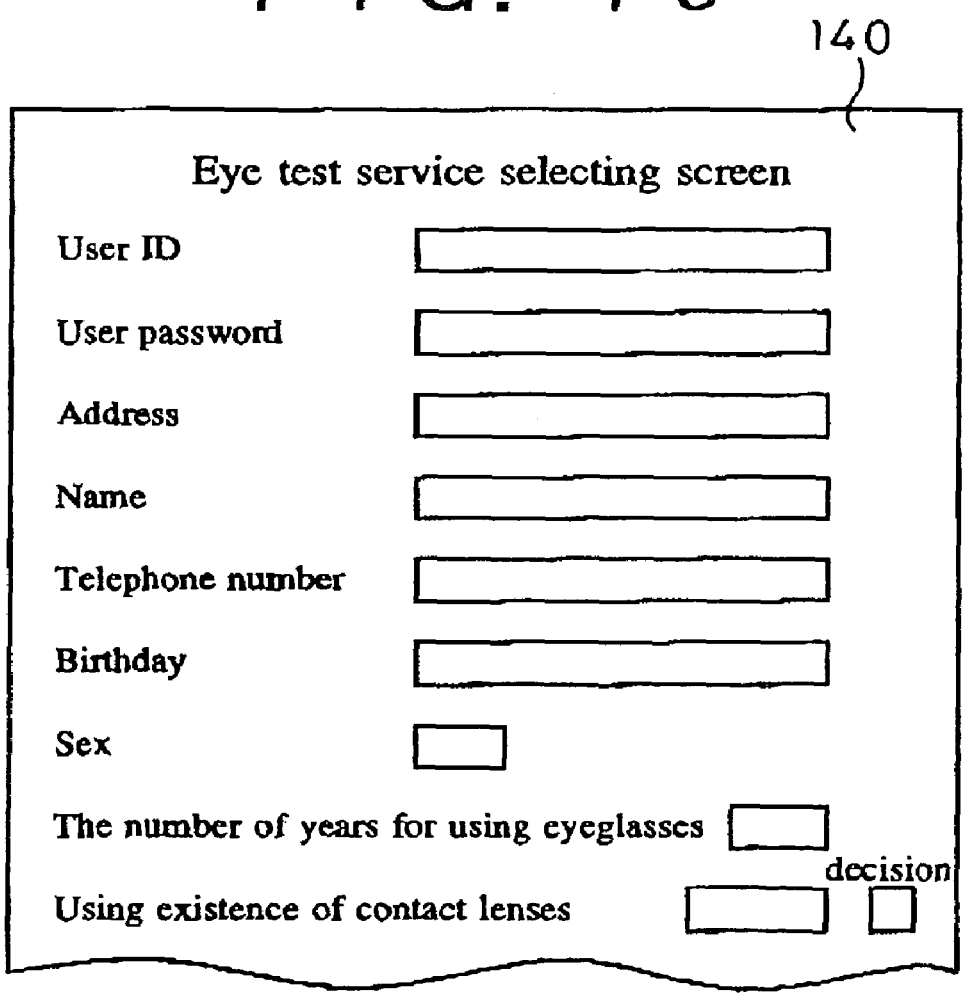
FIG. 19 illustrates an example of the eye test service selecting screen in the eye test service system relating to the third embodiment.

Then, the menu screen of the homepage of the optician 107 is displayed on the screen of the monitor 102, as shown in FIG. 18. When pressing the eye test service selecting screen button on the menu screen, the screen is changed, and an eye test service selecting screen 140 is displayed as shown in FIG. 19.

On the eye test service selecting screen, each of inputting boxes of, for example, "user ID", "user password", "name", "address", "telephone number", "birthday", "sex", "the number of years for using eyeglasses", and "using existence of contact lenses" and the decision buttons are displayed. Also, "name", "address", "telephone number", "birthday", "sex", "the number of years for using eyeglasses", and "using existence of contact lenses" are inputted when using the eye test service apparatus 121, and these data may be preserved in the customer managing database server 108 of the optician 107.

Figure 20:
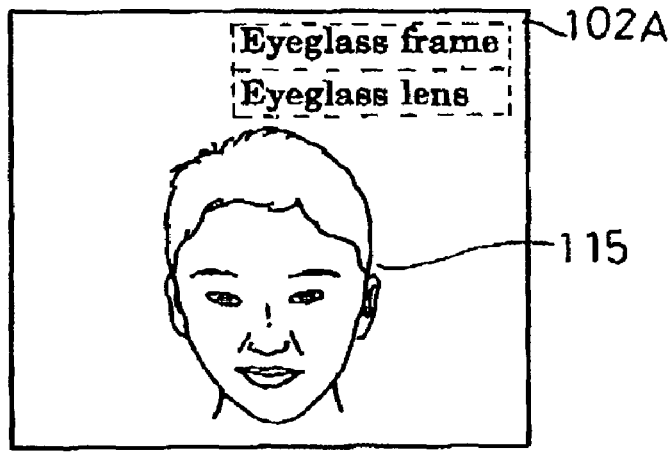
FIG. 20 illustrates the display state of the facial picture in the eye test service system relating to the third embodiment.

When the user inputs the necessary items in each of the input boxes and presses the decision button, these data are transmitted to the web server 111 of the optician 107, and the web server 111 accesses the eye test data information database 110' and shows the facial picture and the eye test data corresponding to the "user ID" and "user password" on the screen 102A of the monitor 102, as shown in FIG. 20, and simultaneously, displays the eyeglass lens selecting button and the eyeglass frame selecting button.

Figure 21:
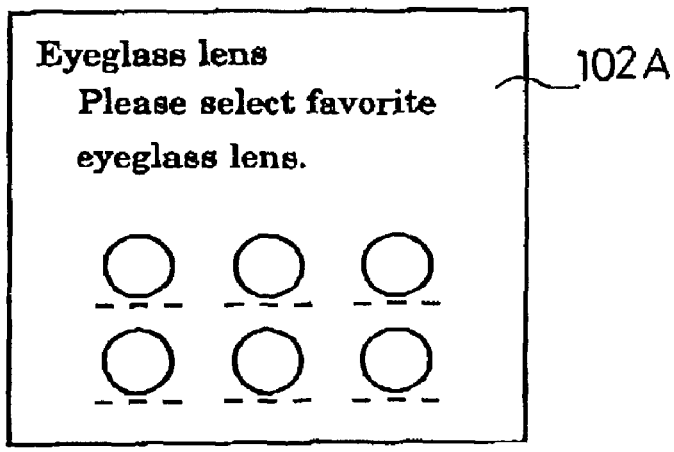
FIG. 21 illustrates an example of the eyeglass lens selecting screen in the eye test service system relating to the third embodiment.

When pressing the eyeglass lens selecting button, as shown in FIG. 21, a plurality of eyeglass lenses are shown on the screen 102A of the monitor 102 according to the eye test data. The user selects and specifies the favorite eyeglass lens among the plurality of eyeglass lenses.

Figure 22:
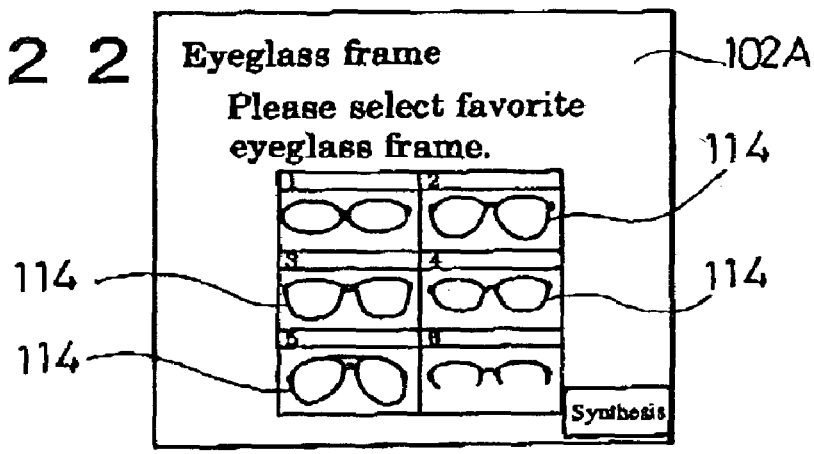
FIG. 22 illustrates an example of the eyeglass frame selecting screen in the eye test service system relating to the third embodiment.

Subsequently, when pressing the eyeglass frame selecting button, a plurality of eyeglass frames to which the selected eyeglass lens can be inserted are shown on the screen 102A of the monitor 102, and simultaneously, the picture synthesizing button is displayed, as shown in FIG. 22. The service user specifies the favorite eyeglass frame among the plurality of eyeglass frames.

Figure 23:
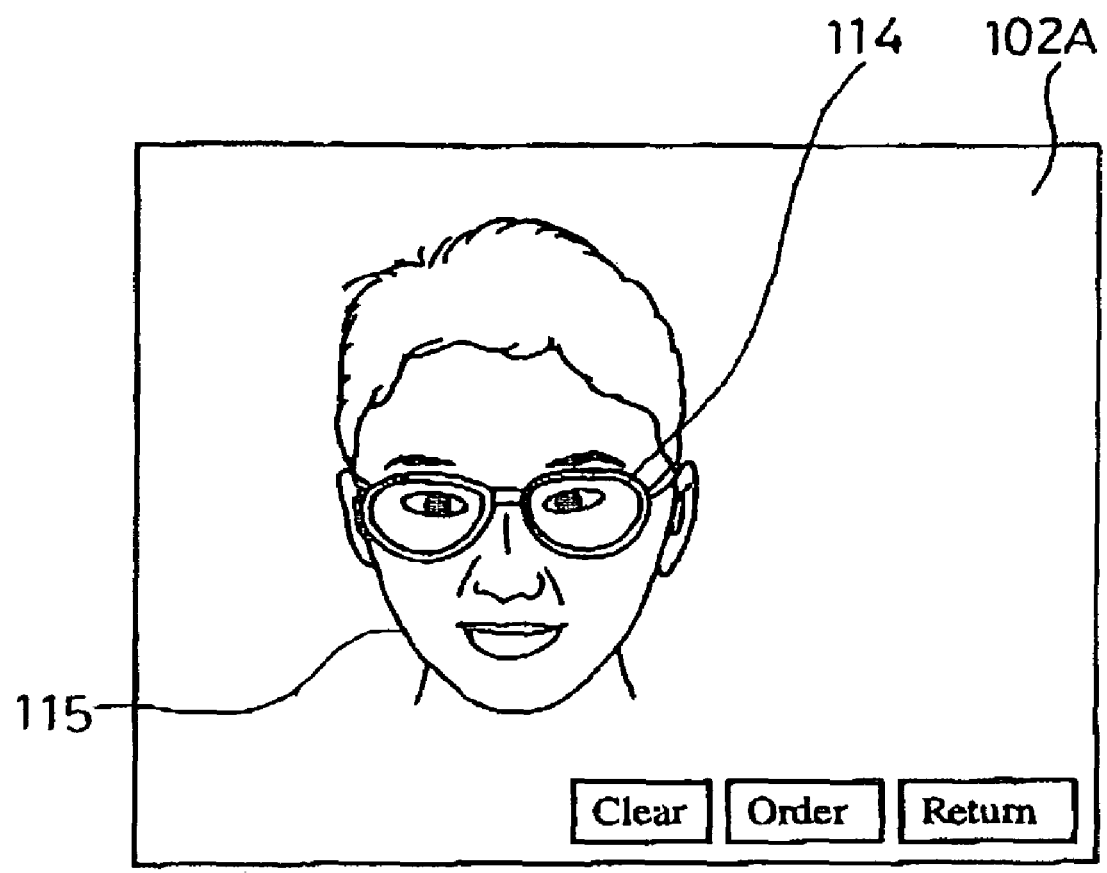
FIG. 23 shows the state that the selected eyeglass frame is synthesized with the facial picture to display the synthesized picture.

Subsequently, when pressing the picture synthesizing button, as shown in FIG. 23, the selected eyeglass frame 114 is synthesized with the facial picture 115, and the synthesized picture is shown on the screen 102A of the monitor 102.

In case where the selected eyeglass frame 114 is not suitable, the selection and synthesis of the eyeglass frame 114 are repeated. In case where the user wants to order the favorite eyeglass frame, when pressing the order button, an order sheet data for the eyeglass frame and eyeglass lens is issued.

In case where the user does not want to order the eyeglass frame, the user presses a clear button to return to the menu screen or stops the connection.

Also, here, because the facial picture photographed by the photographing camera 125 is synthesized and displayed, the magnification relationship between the eyeglass frame and the facial picture is previously known, and accordingly, it is unnecessary for the service user to adjust the photographing magnification for the eyeglass frame 114.

As described above, in the embodiment of the present invention, there is provided the composition that the database system is provided at the optician 107, but there may be provided the composition that only web server is provided at the optician, and the database servers 108, 109, 109' 110, 110' are provided at the place other than the optician 107, for example, a data center.

Also, there may be provided the composition that the web server 111 is provided at the data center, only terminal is provided at the optician 107 and the terminal allows access to the database server.

In FIG. 13, only one eyeglass frame manufacturing maker 113 is shown, but the eyeglass frame manufacturing maker 113 is not limited to one company, and there may be provided the composition that the optician 107 receives the eyeglass frame data from the plurality of eyeglass frame manufacturing makers 113, and there may be provided the composition that the database server is provided at the eyeglass frame manufacturing maker 113 and the eyeglass frame data is called out by access to the database server if necessary.

Also, in the embodiment, the eye test service apparatus 121 issues the user ID and the user password, but the user ID and the user password may be issued from the optician 107 side or the data center side.

In this case, the user ID or the user ID and user password may be transmitted to the electronic mail address which the service user specifies.

According to the third embodiment, the selection of the eyeglass frame can be performed until the user finds the favorite eyeglass frame without causing trouble to the eye test service itself, and even in case of using the eye test service equipment, the personal privacy can be protected.

What is claimed is:

1. A database constructing system comprising:
 a web server;
 statistical analyzing means; and
 a memory means, wherein
 the web server is adapted to receive information on personal body pictures of a number of persons and personal goods to wear or carry, selected by a number of the persons respectively, said information being transmitted through a web browser,
 the statistical analyzing means is adapted to divide the plurality of each of personal body characteristics of the personal body picture of each of a number of the persons into a plurality of components;
 classify each of the divided components into plurality types with respect to a number of the persons; and
 statistically analyze a relationship between a plurality of the types and the selected personal goods to wear or carry with respect to each of the divided components; and thereby collect data for associating the personal body characteristics of a number of the persons with the personal goods to wear or carry selected by each person, respectively, and
 the memory means is adapted to preserve the data selected by each person and personal body characteristics of the plurality of persons.

2. A database constructing system comprising:
 a web server;
 a statistical analyzing means; and
 a memory means, wherein
 the web server is adapted to receive information on personal facial pictures of a number of persons and eyeglass frame, selected by a number of the persons respectively, said information being transmitted through a web browser,
 the statistical analyzing means is adapted to divide the plurality of each of facial types of the personal facial picture of each of a number of the persons into a plurality of components;
 classify each of the divided components into plurality types with respect to a number of the persons; and
 statistically analyze a relationship between a plurality of the facial types and the selected eyeglass frame with respect to each of the divided components; and thereby collect data for associating the facial types of a number of the persons with the eyeglass frame selected by each person, respectively, and
 the memory means is adapted to preserve the data selected by each person and facial types of the plurality of persons.

3. A database constructing system according to claim 2, further comprising:
 a selecting means for selecting an eyeglass frame memorized in said memory means; and
 a showing means for showing the selected eyeglass frame.

4. A database constructing system according to claim 3, wherein said statistical analyzing means has an extracting means for extracting said facial component from said facial picture.

5. A database constructing system according to claim 3, wherein said facial component is selected from facial contour, hair, facial color, eyes, eyebrows, nose, ears, mouth and jaw.

6. A database constructing system according to claim 5, wherein at least age and gender are transmitted together with said facial picture to be reflected to database construction.

7. A database constructing system according to claim 6, wherein racial information is transmitted together with said facial picture to be reflected to the database construction.

8. A database constructing system according to claim 5, wherein said selected eyeglass frame is subdivided into any combination of components such as shape, color, material, maker name and designer name to be associated with said type of facial component.

9. A database constructing system according to claim 5, wherein preference degree for a former selected eyeglass frame is determined on the basis of time interval between the former selected eyeglass frame and a latter selected eyeglass frame.

10. A database constructing system according to claim 5, wherein when an eyeglass frame different from a former selected eyeglass frame is selected, and then, a same eyeglass frame as said former selected eyeglass frame is selected again, a preference degree for the selected eyeglass frame is determined considering that said former selected eyeglass frame is suitable.

11. A database constructing system according to claim 2, further comprising a display means for displaying the relationship between said plurality of the facial types and said selected eyeglass frame by a statistical display method, an association between said plurality of the facial types and said selected eyeglass frame being performed by manual input.

* * * * *